(12) United States Patent
Mendez et al.

(10) Patent No.: US 8,012,219 B2
(45) Date of Patent: Sep. 6, 2011

(54) SYSTEM AND METHOD FOR PREVENTING ACCESS TO DATA ON A COMPROMISED REMOTE DEVICE

(75) Inventors: Daniel J. Mendez, Menlo Park, CA (US); Mason Ng, Mountain View, CA (US)

(73) Assignee: Visto Corporation, Redwood Shores, CA (US)

( * ) Notice: Subject to any disclaimer, the term of this patent is extended or adjusted under 35 U.S.C. 154(b) by 802 days.

(21) Appl. No.: 10/637,267

(22) Filed: Aug. 9, 2003

(65) Prior Publication Data

US 2004/0117310 A1 Jun. 17, 2004

Related U.S. Application Data

(60) Provisional application No. 60/402,287, filed on Aug. 9, 2002.

(51) Int. Cl.
G08B 21/00 (2006.01)
G08B 29/00 (2006.01)
G06F 17/30 (2006.01)
H04L 29/06 (2006.01)

(52) U.S. Cl. ............... 726/35; 726/26; 726/34; 713/164; 713/165; 455/419

(58) Field of Classification Search .................. 713/375; 726/3, 34; 380/260, 274

See application file for complete search history.

(56) References Cited

U.S. PATENT DOCUMENTS

| | | |
|---|---|---|
| 4,714,995 A | 12/1987 | Materna et al. |
| 4,882,752 A | 11/1989 | Lindman et al. |
| 5,150,407 A | 9/1992 | Chan |
| 5,220,501 A | 6/1993 | Lawlor et al. |
| 5,237,614 A | 8/1993 | Weiss |
| 5,265,159 A | 11/1993 | Kung |
| 5,572,696 A | 11/1996 | Sonobe |
| 5,613,012 A | 3/1997 | Hoffman et al. |
| 5,652,884 A | 7/1997 | Palevich |
| 5,664,207 A | 9/1997 | Crumpler et al. |
| 5,684,984 A | 11/1997 | Jones et al. |
| 5,694,546 A | 12/1997 | Reisman |
| 5,713,019 A | 1/1998 | Keaten |

(Continued)

FOREIGN PATENT DOCUMENTS

EP    0 899 647 A2    3/1999

(Continued)

OTHER PUBLICATIONS

Greenberg, Michael S.; Byington, Jennifer C.; Holding, Theophany; Harper, David G. "Mobile Agents and Security". IEEE Communications Magazine. vol. 36, Issue: 7. Pub. Date: Jul. 1998. Relevant pp. 76-85. Found on the World Wide Web at: http://ieeexplore.ieee.org/stamp/stamp.jsp?tp=&arnumber=689634.*

(Continued)

*Primary Examiner* — Nathan Flynn
*Assistant Examiner* — Jeremiah Avery
(74) *Attorney, Agent, or Firm* — Oblon, Spivak, McClelland, Maier & Neustadt, L.L.P.

(57) ABSTRACT

This invention discloses a system and method for selective erasure, encryption and or copying of data on a remote device if the remote device has been compromised or the level of authorization of a roaming user in charge of the remote device has been modified.

31 Claims, 11 Drawing Sheets

U.S. PATENT DOCUMENTS

| | | | |
|---|---|---|---|
| 5,717,925 A | 2/1998 | Harper et al. | |
| 5,748,084 A * | 5/1998 | Isikoff | 340/568.1 |
| 5,832,483 A | 11/1998 | Barker | |
| 5,857,206 A | 1/1999 | Tsutsumitake | |
| 5,870,759 A | 2/1999 | Bauer et al. | |
| 5,896,497 A * | 4/1999 | Halstead | 726/35 |
| 5,903,881 A | 5/1999 | Schrader et al. | |
| 5,940,843 A * | 8/1999 | Zucknovich et al. | 715/210 |
| 5,960,176 A | 9/1999 | Kuroki et al. | |
| 5,987,609 A | 11/1999 | Hasebe | |
| 6,128,739 A * | 10/2000 | Fleming, III | 726/35 |
| 6,151,606 A | 11/2000 | Mendez | |
| 6,160,873 A * | 12/2000 | Truong et al. | 379/102.02 |
| 6,167,253 A * | 12/2000 | Farris et al. | 455/412.2 |
| 6,236,971 B1 * | 5/2001 | Stefik et al. | 705/1 |
| 6,240,091 B1 * | 5/2001 | Ginzboorg et al. | 370/401 |
| 6,286,102 B1 * | 9/2001 | Cromer et al. | 726/35 |
| 6,412,071 B1 * | 6/2002 | Hollander et al. | 726/23 |
| 6,725,379 B1 * | 4/2004 | Dailey | 726/35 |
| 6,778,651 B1 * | 8/2004 | Jost et al. | 379/201.01 |
| 6,832,320 B1 * | 12/2004 | Broyles et al. | 726/18 |
| 6,895,392 B2 * | 5/2005 | Stefik et al. | 705/51 |
| 6,950,946 B1 * | 9/2005 | Droz et al. | 726/35 |
| 7,027,808 B2 * | 4/2006 | Wesby | 455/419 |
| 7,113,912 B2 * | 9/2006 | Stefik et al. | 705/1 |
| 7,216,100 B2 * | 5/2007 | Elliott | 705/36 R |
| 7,216,110 B1 * | 5/2007 | Ogg et al. | 705/80 |
| 7,225,160 B2 * | 5/2007 | Stefik et al. | 705/51 |
| 7,430,668 B1 * | 9/2008 | Chen et al. | 713/187 |
| 7,624,444 B2 * | 11/2009 | Gupta et al. | 726/23 |
| 2001/0037407 A1 * | 11/2001 | Dragulev et al. | 709/250 |
| 2002/0002685 A1 | 1/2002 | Shim | |
| 2002/0066034 A1 | 5/2002 | Schlossberg et al. | |
| 2002/0128972 A1 * | 9/2002 | Stefik et al. | 705/52 |
| 2002/0133465 A1 * | 9/2002 | Stefik et al. | 705/51 |
| 2002/0162011 A1 * | 10/2002 | Tanaka et al. | 713/200 |
| 2003/0023561 A1 * | 1/2003 | Stefik et al. | 705/51 |
| 2003/0097596 A1 * | 5/2003 | Muratov et al. | 713/202 |
| 2003/0149662 A1 * | 8/2003 | Shore | 705/39 |
| 2003/0162555 A1 * | 8/2003 | Loveland | 455/502 |

FOREIGN PATENT DOCUMENTS

| | | |
|---|---|---|
| EP | 0 917 077 A2 | 5/1999 |
| JP | 5-151091 | 6/1993 |
| JP | 6-309214 | 11/1994 |
| JP | 7-509333 | 10/1995 |
| JP | 8-77052 | 3/1996 |
| JP | 8-137732 | 5/1996 |
| JP | 8-314805 | 11/1996 |
| JP | 9-73423 | 3/1997 |
| JP | 9-218815 | 8/1997 |
| JP | 11-15715 | 1/1999 |
| JP | 2002-216099 | 8/2002 |
| WO | WO 94/12938 | 6/1994 |
| WO | WO 97/04389 | 2/1997 |
| WO | WO 97/35265 | 9/1997 |
| WO | WO 02/12985 A2 | 2/2002 |

OTHER PUBLICATIONS

U.S. Appl. No. 90/008,292, filed Oct. 11, 2006, Mendez.

Office Action mailed Jul. 27, 2010 in Japanese Patent Application No. 2009-184961 filed Aug. 7, 2009 (English-language Translation only).

Office Action mailed Nov. 18, 2008 in Japanese Patent Application No. 2000-540509 filed Jan. 15, 1999 (English-language Translation only).

Office Action mailed Apr. 7, 2009 in Japanese Patent Application No. 2000-540509 filed Jan. 15, 1999 (English-language Translation only).

Shinsuke Kawasaki, "A salesman makes replication every morning by a DB update agent with ease", Nikkei Communications, Japan, K.K. Nikkei BP, Sep. 1, 1997, No. 253, pp. 139-144.

Hiroshi Fujimori, "New stress-free working technique with the use of Notes", CYBIZ, Japan, K.K. Cybiz, Dec. 1, 1997, vol. 2, No. 14, pp. 118-121.

M. Lambert, "PCMAIL: A Distributed Mail System for Personal Computers", Network Working Group, Jun. 1988, pp. 1-38.

U.S. Appl. No. 12/796,969, filed Jun. 9, 2010, Quinlan, et al.

Extended European Search Report issued Apr. 19, 2011, in Euporean Application No. 10 18 5486.7 (in English).

* cited by examiner

SYSTEM AND METHOD FOR PREVENTING ACCESS TO DATA ON A COMPROMISED REMOTE DEVICE

CROSS REFERENCE TO RELATED APPLICATIONS

This application claims benefit under 35 U.S.C.§119 to U.S. provisional patent application No. 60/402,287 entitled "System, Method, and Computer Program Product for Cleaning-Up A Remote Device That Is No Longer Authorized To Access A Global Server System," by inventors Daniel J. Mendez and Mason Ng filed on Aug. 9, 2002 and is incorporated by reference.

FIELD OF THE INVENTION

This invention relates to the field of remote data access and, more particularly, to techniques for autodestruction of data available on a remote device that has been compromised and is subject to be used by a user without authorization.

BACKGROUND OF THE INVENTION

Data accessibility and consistency are frequently significant concerns for computer users. When a roaming user who has traveled to a remote location needs to review or manipulate data such as e-mails or documents, the roaming user must either carry the data to the remote location or access a workstation remotely. Because maintaining a true copy of a database containing the necessary data can be a cumbersome process, system designers have developed various techniques for connecting a remote device across a computer network to a server storing the data.

Millions of people, including employees of companies and organizations, use remote access technology for communication of data in the performance of their jobs. Companies and organizations are often under pressure for finding ways to rapidly and cost-effectively connect mobile employees to key organizational information utilizing existing and often disparate communications platforms and devices. Resolving the issues of access, synchronization, and security regarding remote access technology may be crucial to these organizations.

The use of remote access technology for communication of data may be one of the factors leading to the increasing importance of synchronization technology. When copies of the same data resides in more than one place, as the value of a copy of this data at one of these places is changed, the value of the copy of the same data at other locations must be updated to reflect the most recent change. Synchronization process refers to a process of updating data values to reflect the most recent changes in the value. For example, a data value may be modified by the remote user by input of a new value to the remote device. By using the process of synchronization the value of copies of the same data at the server location is modified to reflect the change at the remote device. Data values may also be changed at the server location. In that case, the process of synchronization is needed to modify the values of the corresponding copies of data at the remote device in order to reflect the change at the server location. In short, the synchronization process may be used to update old values of data to become equal to the new values.

Synchronization of email over the Internet and generic synchronization of other: workplace data such as files, contacts, and calendars is handled with appropriate applications. As users rely on multiple intelligent devices, that may be located at different places, to communicate and organize their key data, they need to synchronize the data collected at or communicated from different places to make sure that they have access to the most up to date version of data. Frequently, facilitating access and updating the remote user's data through synchronization allows the remote device to be in possession of the most up-to-date data available at the server housing the database. Synchronization also allows transmission of any changes to the data at the remote site back to the server. As such, the user in control of a remote device that is in communication with the central repository for the data at the server may cause modification of the data available on the server.

Because through synchronization changes to data by a remote user may cause changes to, the data at the central repository, unauthorized change in the data at the remote location endangers the data at the central repository. In some example scenarios, the remote device may be lost or stolen or the user in control of the device may lose authorized status. In any scenario where the remote device falls in unauthorized hands, both the data on the remote device and the data at the server are in danger of being used without authorization, falsely modified, or deleted. Any of these events may at the least cause delay and loss of business and at the most prove catastrophic to the viability or the business of the organization. While transmissive encryption technologies may be used to ensure privacy of data in transit; transmissive encryption is usually irrelevant to the security measures that are needed in the case that the remote device itself is compromised or the remote user loses authorized status.

SUMMARY OF THE INVENTION

Embodiments of the present invention provide a method, a system, and a computer program product for a user in charge of the data at an establishment, such as a company, a government agency, a private club, etc. to prevent misuse of data on a remote device that is in communication with a global server system at, for example, a central location of the establishment if the remote device has been compromised or the user of the remote device loses authorized status.

In an embodiment of the present invention, a method for erasing data from a compromised remote device is disclosed that comprises a) exchanging data with a remote device via a network, wherein the remote device has one, or more types of data stored therein; b) receiving an indication that the remote device is compromised; c) selecting at least one of the one or more types of data for erasure in the remote device; and d) transmitting an order to erase data to the remote device via the network. In this embodiment, the order identifies the at one lease type of data to be erased in the remote device and data of the type, of data identified by the order is erased in the remote device upon receipt of the order by the remote device.

Other embodiments of this invention may include a system for autodestruction of data on a remote device (remote device data) that is in communication with a server storing copies of the same data (server data) comprising a global server for storing and manipulating server data and remote device data and one or more one remote device for storing and manipulating remote device data. The global server and the remote devices are capable of communicating via a network. The server data includes non-synchronized and synchronized type data. The remote device data includes non-synchronized and synchronized type data as well. The global server includes a datastore for storing server data, a remote access server for communicating with the remote devices, and a synchronization server for communicating with the remote devices. The remote device server in turn has an autodestruct server for automatically destroying non-synchronized type remote device data and the synchronization server in turn has an autodestruct server for automatically destroying synchronized-type remote device data. The remote devices include a datastore for storing remote device data, a remote access client for communicating with the remote access server, and a synchronization client for communicating with the synchronization server. The remote access client has an autodestruct client for automatically destroying non-synchronized type remote device data; and the synchronization client has an autodestruct client for automatically destroying synchronized type remote device data. The communication between the remote devices and the server comprises of communication between the remote access server and the remote access client, and communication between the synchronization server and the synchronization client. The remote devices may be capable of communicating among themselves as well.

In another embodiment of the invention, the autodestruct server may further comprise an erasure controller for controlling which remote device data is to be destroyed, a remote device connection severing requester for requesting the remote device to sever its connection with the network, and a server connection severing engine for severing the connection between the global server and the network.

In another embodiment, the autodestruct client may further comprise a data tracker for keeping track of data transfers and remembering the final location where data is stored, a data eraser for erasing all or parts of remote device data, a reformatter for reformatting the remote device, and a remote device connection severing engine for severing the connection of the synchronization client or the remote access client with the network.

The embodiments of this invention include a method for autodestruction of data by storing data in at least one category of data, in a server, each category of data stored in the server (server data) being either of a non-synchronized type or of a synchronized type, storing data in at least one category of data in a remote device, each category of data stored in the remote device (remote device data) being either of a non-synchronized type, of a synchronized type, or of a personally owned type, communicating the non-synchronized type data via a remote access connection between a remote access server of the server and a remote access client of the remote device, tracking the location, category, and type of each server data and each remote device data, executing a process of synchronization, being referred to as a synchronization event, receiving an indication marking at least one category of data, or alternatively at least one type of data, in the remote device for destruction or receiving an indication marking at least one type of data in the remote device for destruction, and requesting the remote device to activate a set procedure, to destroy the at least one category of data that is marked for destruction.

In one embodiment, the values of the server data and remote device data may include a time stamp indicating the time the value was last modified.

In another embodiment, the type of a category of data may be changed from the synchronized type to the non-synchronized type. Synchronized data categories whose type is changed to non-synchronized may include applications and timesheet data. The type of a category of data may also be changed from a non-synchronized type to the synchronized type. Examples of synchronized data categories whose type is changed to non-synchronized include applications and timesheet data.

The categories of data may include at least one of a category of e-mail data, a category of calendar data, a category of file data, a category of bookmark data, a category of task data, a category of sales force automation data, a category of customer relations management data, a category of corporate directory data, a category of personal information manager data, and a category of applications data.

The non-synchronized data categories include employee salaries and passwords, and the synchronized data categories include calendar data and corporate directory data.

In other embodiments, the change in the type of data may be communicated to the tracker by a user in charge of changing the type of data, where the change in the type of data is found out by the tracker during a subsequent synchronization event.

Synchronization may utilize the time stamps to determine the most recent data value corresponding to each data, where synchronizing the synchronized type data includes updating values of synchronized type data at one location if a corresponding value is modified at the other location, to reflect the most recent modification of the value of the data, on the synchronized type data via a synchronization connection between a synchronization server of the server and a synchronization client of the remote device. Synchronization may occur automatically, without initiation by a user. Synchronization may occur at predetermined times. Synchronization may occur periodically. It may occur upon detecting a change in a data value at the remote device, upon detecting a change in a data value at the server system, or upon instructions from a user.

In other embodiments, destruction may include complete erasure of the remote device data marked for destruction, tagging of the remote device data marked for destruction, or pointing to the remote device data marked for destruction.

In other embodiments, the set procedure may comprise destroying the synchronized type data on the remote device; requesting the remote device to reformat; requesting erasure of personally owned data on the remote device; requesting erasure of applications on the remote device; requesting erasure of non-synchronized data on the remote device; requesting erasure of synchronized data on the remote device; requesting encryption of all data, synchronized type data, personally owned data, non-synchronized data and/or applications on the remote device; severing the remote access connection between the remote device and the serve; severing the synchronization connection between the remote device and the server; and/or severing both the remote access connection and the synchronization connection between the remote device and the server.

In other embodiments, reformatting at the remote device may comprise requesting erasing all data from the remote device and severing the communication between the server and the remote device, and leaving the operating system of the remote device intact so that the remote device remains a thinking machine.

DESCRIPTION OF SEVERAL VIEWS OF THE DRAWINGS

The following figures depict examples of various systems and methods in accordance with embodiments of the present invention.

DETAILED DESCRIPTION

The statement of the problem in the Background section makes clear that a system and method are needed for preventing the unauthorized use of data on a remote device that is in communication with a central repository of data such as a server system. A system, method, and computer program product are presented here that address the problem of unauthorized access to data on a remote device or on a server that is in communication with the remote device.

Figure 1:
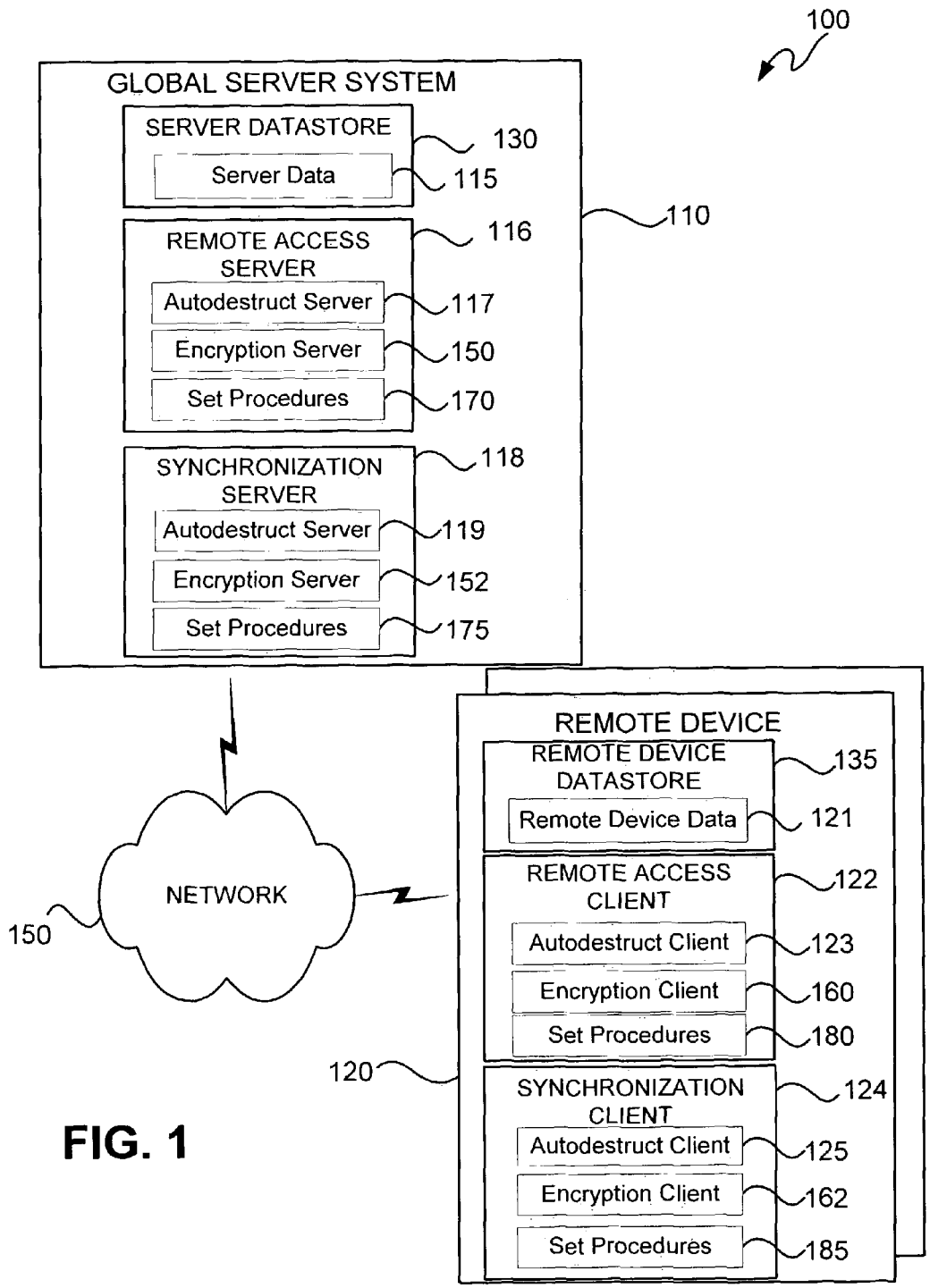
FIG. 1 is a block diagram illustrating a network system.

FIG. 1 is a block diagram illustrating a network system 100 in accordance with an embodiment of the present invention. As depicted in FIG. 1, the network system 100 includes a global server system 110 that is in communication with one or more remote devices 120 via a network 150. The server system 110 may be coupled to the network. 150 via any type of suitable connection such as wireless or wired (fiber-optics, coaxial cable, ISDN, copper wire, etc.) connections. Similarly, the remote devices 120 may be coupled to the network 150 via any suitable connection. Optionally, the remote device 120 and the server system 110 may be connected via direct wired or wireless connection. As such, the remote devices 120 may be mobile or stationary. Mobile devices are those that are portable and easily carried around by the user. Examples of mobile-devices include mobile telephones, palm pilots, and laptop computers. The remote devices 120 may be in communication with other remote devices utilizing the network 150.

It should be noted that the embodiments of this invention are capable of providing access to a broad assortment of remote devices that may be stationary or mobile computing devices and work with the most widely used enterprise messaging applications such as Microsoft Outlook and Lotus Notes. Examples of suitable networks 150 include WAN (Wide Area Networks), LAN (Local Area Networks), telephone networks, the Internet, or any other wired or wireless communication network.

The global server system 110 may include a server datastore 130, a remote access server 116, and a synchronization server 118. The server datastore 130 may be used to store server data 115 that is synchronized with remote device data 121 or otherwise accessed by the remote device 120. The remote access server 116 further includes an autodestruct server 117, an encryption server 150, and a set procedures file 170. The synchronization server 118 further includes an autodestruct server 119, an encryption server 152, and a set procedures file 175.

The remote device 120 may similarly include remote device datastore 135, a remote access client 122, and a synchronization client 124. The remote device datastore 135 may be used to store remote device data 121. The remote access client 122 further includes an autodestruct client 123 and an encryption client 160. The synchronization client 124 further includes an autodestruct client 125 and an encryption client 162.

The remote access server 116, the synchronization server 118, the remote access client 122, the synchronization client 124, and the security systems (not shown) of the server system 110 and those of the remote device 120 may support any suitable protocol that may for example include WAP (Wireless Application Protocol), WML (Wireless Markup Language), HDML (Handheld Device Markup Language), SMS (Short Message System), HTML (Hypertext Markup Language), HTTP (Hypertext Transfer Protocol), and/or SMTP (Simple Mail Transfer Protocol).

The remote access server 116 resides on the server system 110, that may for example be located at a central location such as an organization's headquarter, and the remote access client 122 resides on the remote device 120, for example at a roaming user's end. The remote access client 122 permits the remote device 120 to access the server data 115 via the remote access server 116.

Copies of the same data 115/121, or subsets thereof, may reside on the server 110 and the remote device 120 respectively. When copies of the same data reside in more than one place, as the value of this data at one of these places is changed, the value of the copy of the same data at other locations must be updated to reflect the most recent change. A synchronization process may be used to synchronize the data, i.e., to update old values of data to become equal to the new values.

The synchronization server 118 resides on the server system 1O while the synchronization client 124 resides on each remote device 120. The synchronization server 118 and the synchronization client 124 operate to synchronize the copies (or subset(s)) of the data 115 on the server 110 with the copies (or subset(s)) of the same data 121 on the remote device 120. A synchronization process may be executed automatically without any initiation from the user. For example, the synchronization server 118 and the synchronization client 124 may be set to execute the synchronization process at preset times, at preset intervals, or upon detecting a change in the data on one side. As another-option, synchronization may be executed upon user instruction. Every time the synchronization process is executed, a synchronization event occurs. A synchronization event, thus, may occur at preset time intervals, every time data values at one end are changed, every time a user at one end wishes it, or according to some other criteria.

The synchronization server 118 and the synchronization client 124 operate to replace the older data values with the corresponding newer data values. Older data values may be distinguished from newer values using various methods such as time stamps. If, for example, each data value is further qualified with a time stamp, the synchronization server 118 and synchronization client 124 may use a comparison between the time stamps to identify the later-data value and update the earlier data value to reflect the latest modifications to the value. Using the time stamp, the synchronization server 118 or client 124 selects the later data value that may replace the earlier version.

Illustrative examples of synchronization schemes that may be utilized for carrying out a synchronization process are disclosed in U.S. Pat. No. 6,023,708, titled "System and Method for Using a Global Translator to Synchronize Workspace Elements Across a Network," by Mendez et al., U.S. Pat. No. 6,151,606, titled "System and Method for Using a Workspace Data Manager to Access, Manipulate and Synchronize Network Data," by Mendez, and U.S. Pat. No. 6,085,192, titled "System and Method for Securely Synchronizing Multiple Copies of a Workspace Element in a Network," by Mendez et al., all of which are incorporated by this reference.

The autodestruct server 117 of the remote access server 116 transmits erasure and other commands to the autodestruct client 123 of the remote access client 122 when a user of the remote device 120 loses authorization to use the device 120 or when the device 120 is compromised (e.g., lost, stolen). The commands can be included in a set procedures file 170 that indicates the procedures to follow. In an embodiment, the remote access client 122 erases a subset of data in the remote device data 121 that includes data remotely accessed from the remote access server 116 but is not necessarily synchronized with server data 115. Alternatively, the subset of data can be thought of as one-way synchronized, i.e., changes in the corresponding subset of data in server data 115 leads to an update the subset in the remote device data 121, but not vice versa. An example of this subset can include corporate directory data. The remote access client 122 can also erase personal data and applications in the remote device data 121. Other commands in the set procedures file 170 can include formatting commands, communications link severance commands, encryption commands, copying, etc. In another embodiment of the invention, the autodestruct server 117 can instruct the autodestruct client 123 to first transmit specified data (e.g., non-synchronized and/or personal data) to the server datastore 130 for storage and then instruct the autodestruct client 123 to erase the data. The autodestruct server 117 and client 123 will be discussed in further detail below.

The encryption server 150, in conjunction with the autodestruct server 117, can transmit instructions in the set procedures file 170 to the encryption client 160. Instructions for the encryption server 150 can include encrypting all or a subset of data from remote device data 121, thereby preserving the data but preventing an unauthorized user from accessing the remote device data 121 on the remote device 120. If the remote device 120 is recovered, the encrypted data can be decrypted and accessed. If the data is extremely sensitive and therefore the risk of misuse if decrypted very high, the autodestruct server 117 can instead instruct the autodestruct client 123 to erase the data instead of the encryption server 150 instructing the encryption-client 160 to encrypt the data. In an alternative embodiment, the data can first be encrypted and then erased so that if the erased data is somehow recovered, it will still be in an encrypted format. The encryption server 150 and the client 160 will be discussed in further detail below.

The autodestruct server 119 and the encryption server 152 are substantially similar to the autodestruct server 117 and the encryption server 119 but generally operate to transmit instructions to the autodestruct client 125 and the encryption client 162, which act upon synchronized data in the remote device data 121 in substantially similar fashion to the autodestruct client 123 and the encryption client 160. The set procedures file 175 can be substantially similar to set procedures file 170 but may include different instructions because of the nature of the data acted on by the synchronization client 124. It will be appreciated by one of ordinary skill in the art that the remote access server 116 and the synchronization server can be combined into a single unit that transmits instructions to the remote device 120 to operate on the remote device data 121. The single unit can transmit instructions to the remote device 120 to operate on all remote device data 121 in a similar manner or to operate on the data 121 based on type (e.g., synchronized, non-synchronized, personal, etc.). Similarly, in an embodiment of the invention, the remote access client 122 and the synchronization client 124 can also be combined into a single unit to operate on the remote device data 121 based on data type. The remote device data and types will be discussed in further detail below in conjunction with FIG. 3 and FIG. 5.

In an embodiment of the invention, the remote access client 122 and the synchronization client 124 of the remote device 120 can each include a set procedures file 180 and 185 respectively. The set procedures files 180 and 185 are substantially similar to the set procedures files 170 and 175 and are used when the remote device 120 self-initiates an autodestruct and/or encryption routine. The remote device 120 can self-initiate the procedures when it has determined that it has been compromised. For example, the remote, device 120 can require the regular input of a code. If the scheduled input of the code is missed or if the inputted code is incorrect, this could indicate the device 120 has been compromised and therefore the remote device data 121 or a subset thereof needs to be encrypted or erased. This can be useful in situations when the remote device 120 has been compromised but is not in contact with the global server system 110 and so the system 110 cannot initiate procedures in the set procedures files 170 and/or 175.

During operation of the network system 100, the remote device 120 accesses data from the global server system 110. For non-synchronized data, the remote access client 122 interacts with the remote access server 116. For synchronized data, the synchronization client 124 interacts with the synchronization server 118 to exchange data according to synchronization processes known in the art. Synchronization between the server 118 and the client 124 can occur at regularly scheduled intervals or can be manually initiated by a user of the remote device 120 or the operator of the global server system 110.

If the remote device 120 has been compromised (e.g., lost, stolen, or the user is no longer authorized to access data), the remote access server 116 and the synchronization server 118 can transmit instructions to the remote access client 122 and the synchronization client 124 respectively of the remote device 120 to encrypt and/or erase all or subsets of the remote device data 121. In addition, the remote access server 116 and the synchronization server 118 can transmit instructions to the remote access client 122 and the synchronization client 124 respectively to transmit a copy of all or subset of the remote device data 121 to the global server system 110 or other location for storage and evaluation. In addition, as described above, if the remote device 120 is compromised, the remote device 120 can self-initiate an erasure and/or encryption routine.

Figure 2:
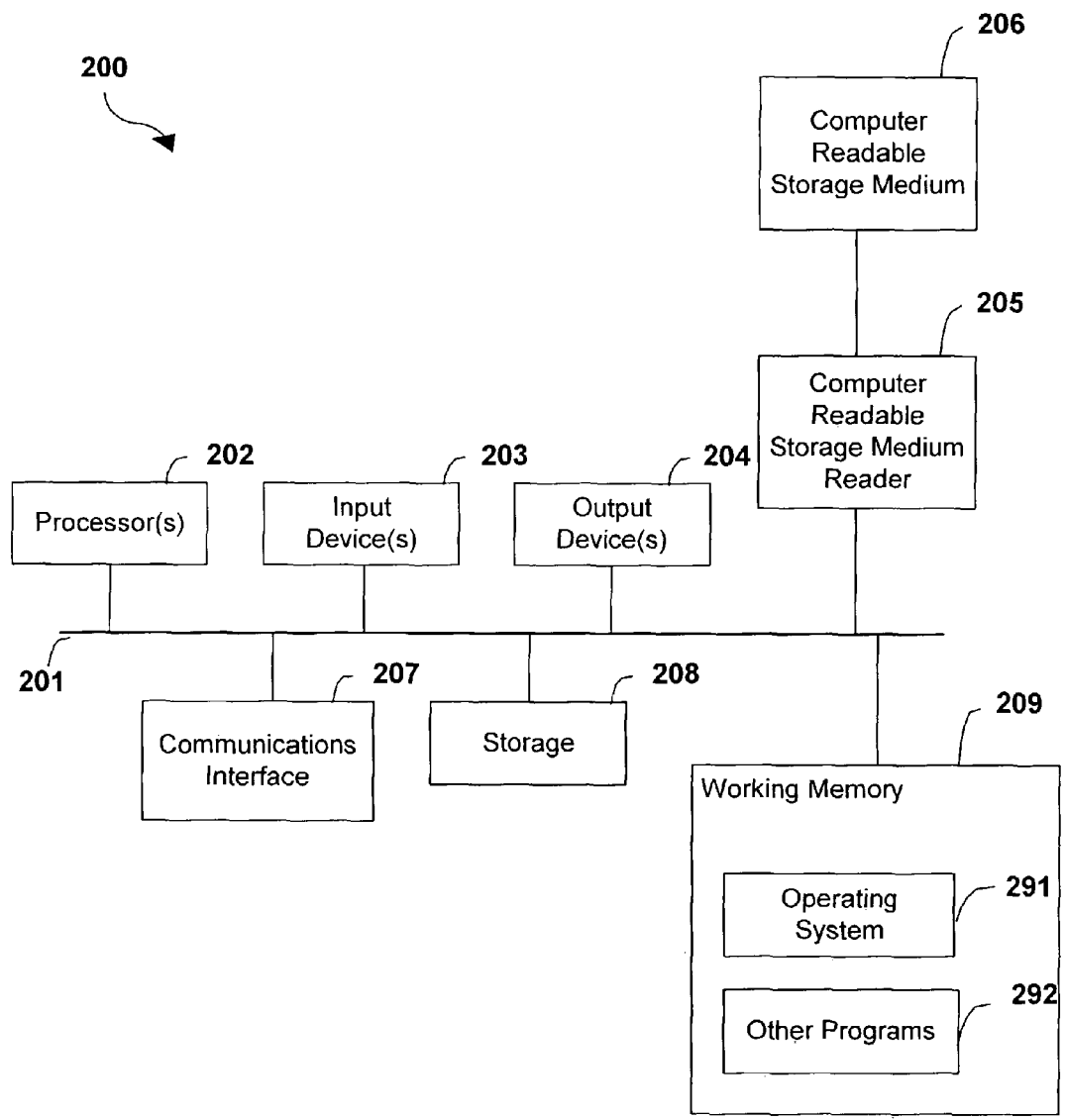
FIG. 2 is a block diagram illustrating an example of a computer system.

FIG. 2 is a block diagram illustrating an exemplary computer system 200 that may be utilized to carry out embodiments of the present Invention. The server system 110, the remote device 120, and components of these systems may include such a computer system 200 or parts thereof. The computer system 200 includes one or more processors 202, input devices 203, output-devices 204, readers 205 for reading computer readable storage media, computer readable storage media 206, a communication interface 207, storage media 208, and a working memory 209 that further includes an operating system 291 and other programs 292. A bus 201 couples these components together.

The processor(s) 202 usually controls all the other parts and may generally include a control unit, an arithmetic and logic unit, and memory (registers, cache, RAM and ROM) as well as various temporary buffers and other logic. The control unit fetches instructions from memory and decodes them to produce signals that control the other parts of the computer system. Some illustrative examples of the processor(s) 202 may include Intel's PENTIUM and CELERON processors, Motorola's 14500B, or the like.

Input devices 203 or peripherals may be used to transfer data to and from the computer system. Some input devices may be operated directly by the user, such as keyboard, mouse, touch screen, joystick, digitizing tablet, or microphone. Other input devices may include sensors or transducers that convert external signals into data, for example, an analog to digital converter such as a microphone.

Output devices 204 may include electronic or electromechanical equipment coupled to the computer system and may be used to transmit data from the computer in the form of text, images, sounds or other media to the communication interface 207 that may be a display screen, printer, loudspeaker or storage device 208. Most modern storage devices such as disk drives and magnetic tape drives act as both input and output devices, others are input only.

The communications interface 207 may be used to couple the bus 201 to a computer network 150 and may include an Ethernet card, a modem, or other similar software or hardware. Ethernet is a type of local area network, which sends its communications through radio frequency signals carried by a coaxial cable. Each computer checks to see if another computer is transmitting and waits its turn to transmit. Software protocols used by Ethernet systems vary, but include Novell Netware and TCP/IP. A modem connects computers to each other for sending communications via the telephone lines. The modem modulates the digital data of computers into analog signals to send over the telephone lines, then demodulates back into digital signals to be read by the computer on the other end.

Computer-readable storage medium readers 205 may be used to access and store information on the computer-readable storage media 206. Computer-readable storage medium readers 205 may include disk drives, CD-ROM drives, or DVD drives. Computer-readable storage media 206 may include diskettes, CD-ROMs, or DVDs.

Storage 208 or memory is a device into which data can be entered, in which they can be held, and from which they can be retrieved at a later time. Storage 208 may include the hard disk space of the computer system 200 capable of permanently storing data and applications.

Working memory 209 may include random access memory (RAM) which, in turn, houses the operating system 291 and other programs 292. The RAM may be built from semiconductor integrated circuits, which can be either static (SRAM) or dynamic (DRAM). RAM is usually volatile although non-volatile random-access memory may also be used.

The operating system 291 is a low-level software which handles various tasks for example interfacing to peripheral hardware, scheduling of tasks, allocating storage, and presenting a default interface to the user usually when no application program is running. Some examples of the operating system 291 may include UNIX, XENIX, Linux, OS2/WARP, DOS, Windows, Windows 95, Windows 98, Windows CE, Windows NT, Windows 2000, Macintosh System 7, IBM's VM and VS/VME or operating systems specifically engineered for handheld devices such as PalmOS, EPOC, Windows CE, FLEXOS, OS/9, and JavaOS, or any other type of operating system capable of operating various types of computers.

Figure 3:
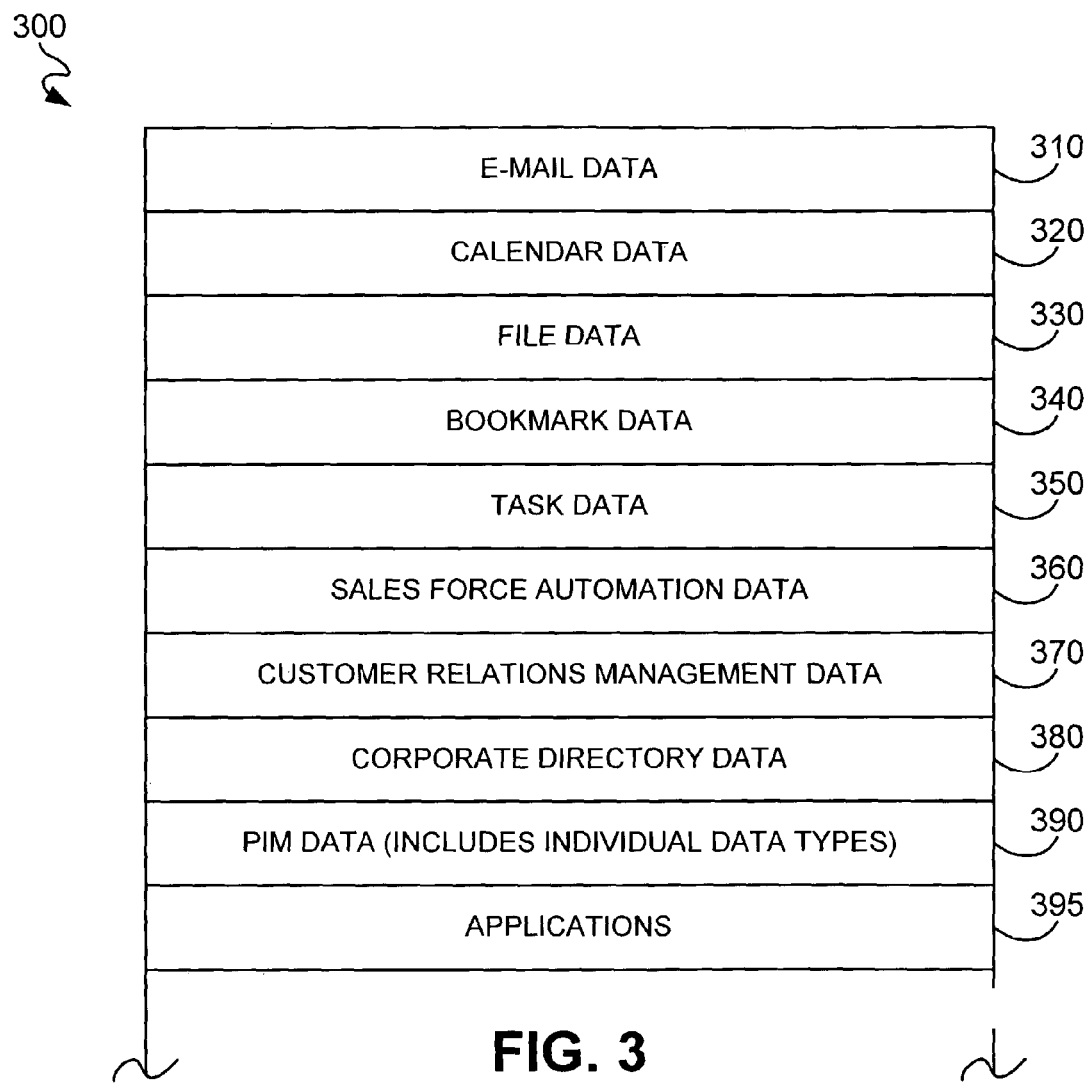
FIG. 3 is a block diagram illustrating examples of categories of server data that may be stored as either synchronous or non-synchronous type data in the global server system.

FIG. 3 is a block diagram illustrating examples of various categories of server data 115. The server data 115 and the remote device data 121, that are stored in the server datastore 130 and the remote device datastore 135 respectively, may include one or more data categories. These categories may for example include email data 310, calendar data 320, file data 330, bookmark data 340, task data 350, sales force automation data 360, customer relations management data 370, organizational directory data 380, personal information manager (PIM) data 390, various applications 395, and other data types.

Examples of email data 310 may include the contents of an email, the dates it was sent and received, the addresses of the sender and the receiver, and the title of the email. Examples of calendar data 320 may include the dates and the events scheduled for each date and other characteristics of each date such as whether the date is a holiday or not. Examples of file data 330 may include file names, contents, dates of creation of the file, and file location. Examples of bookmark data 340 may include Internet addresses of bookmarked locations and an identifier or name corresponding to the address. Examples of task data 350 may include information about the tasks to be performed and the dates of performance and the personnel assigned for performance of each task. Examples of sales force automation data 360 may include data on automation of the sales activities of the salespersons of an organization. Examples of customer relations management data 370 may include various types of data about various customers of an organization. Examples of corporate (or other organization-type) directory data 380 may includes names, positions, locations, and contact information of the persons working for an organization. Examples of personal information manager (PIM) data 390 may include data used by a person in the day-to-day management of the person's life and activities Examples of various applications 395 may include word processing applications such as Microsoft Word or WordPerfect, spreadsheet applications such as Lotus 1-2-3 and Excel, drafting applications such as Autocad, and the like. The server data 115 and remote device data 121 may include entire data files, applications, or other data units.

Figure 4:
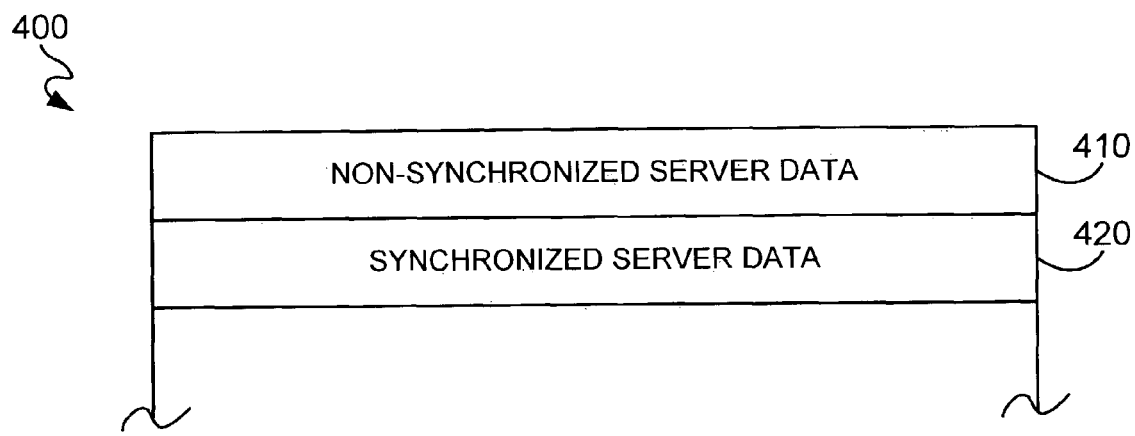
FIG. 4 is a block diagram illustrating types of server data.

FIG. 4 is a block diagram showing the server data 115 of the global server system 110. The server data 115 may include two types of data, non-synchronized type data 410 and synchronized type data 420.

Non-synchronized server data 410 may be defined as a type of data that should not be modified based on the modifications of data on a remote device 120. Non-synchronized data 410 is served by the remote access server 116 to the remote access client 122. This data may be either data that is not accessible (or even visible) to the remote device 120 or data that can be accessed and stored by the remote device 120 but should not be changed or altered by the remote device 120. The synchronization process does not impact this type of data and does not update the data values of this type at the server location when the corresponding data value has been changed at the remote device location. Examples of non-synchronized data 410 may include sensitive data, for example, data relating to security such as passwords and encryption information, or employee salaries.

Synchronized data 420 may be defined as a type of data that can be synchronized utilizing a synchronization process. The synchronization server 118 can serve this data to the synchronization client 124. As explained above, it is generally desirable to protect some data values from being changed by a user in the field; these are data that should either stay constant or be changed only at a central location by someone with central authority. On the other hand, synchronized data is the type of data that is permitted to be modified by a roaming user at the remote device 120 and the change in the data value is meant to be transferred to the corresponding server data 115 during a subsequent synchronization event. Examples of synchronized data may include the kind of data regularly collected by roaming users that utilize a remote device. This data may vary depending on the type of organization and may include sales data, technical data, scheduling data, census data, and the like. In these cases, the roaming user is usually in the best position to update the data value and it is desirable to communicate the update to the central location.

Figure 5:
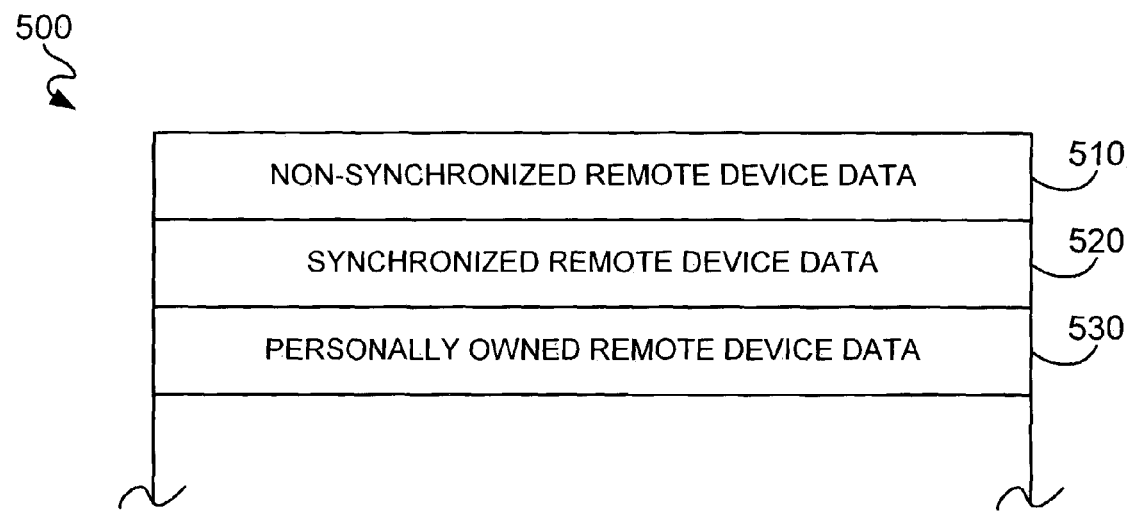
FIG. 5 is a block diagram illustrating types of remote device data.

FIG. 5 is a block diagram showing types of remote device data 121. The remote device data 121 include non-synchronized remote device data 510, synchronized remote device data 520, and personally owned remote device data 530.

As explained in the context of server data types, if and while the data values on the remote device are classified as non-synchronized data type 510, these data will not be affected by changes in the corresponding data values on the server system 110. Conversely, a change in the data value on the remote,device 120 will not automatically impact the value of the corresponding data on the server system 110. However, in an alternative embodiment, the non-synchronized data type 510 can actually be one-way synchronized. That is, changes in server data 115 will change the remote device data 121, but not vice versa. The non-synchronized server data 410 may be accessed by the remote device 120 through the use of the remote access client 122 and the remote access server 116. The non-synchronized remote device data 510 may include the same categories of non-synchronized server data 410 and may further include categories of data different from non-synchronized server data 410. Typically, the non-synchronized remote device data 510 may belong to the entity controlling the server system. Examples of non-synchronized remote device data 510 may include sensitive data, for example, data relating to security such as passwords and encryption information, or employee salaries.

The synchronized remote device data values 520 may be updated during a synchronization event if the corresponding synchronized server data 420 values have been modified since the last synchronization event. At the same time, any modifications in the synchronized remote device data 520 will result in corresponding changes in the synchronized server data 420 during a subsequent synchronization event. Those data categories that may be freely modified by the user of the remote device 120 usually fall under the synchronized type. Also, when it is crucial that the roaming user has access to the most current value of a: data category, this category must be classified as synchronized data 520 and must be updated regularly with changes on the server system side 110. Calendar data and organizational directory data are examples of categories of data that fall under this type.

The personally owned data 530, in contrast to the previous types, belongs to the user of the remote device and ideally speaking should not be accessed or modified by the user in charge of handling the data and the server system, for example an information technology administrator at a company. In an example scenario, the remote device 120 in custody of the roaming user belongs to the organization in control of the server system 110 and is controlled by the user in charge of controlling the server system. The organization may authorize the roaming users to install personal data or applications on the remote devices assigned to them. In such cases, the user in charge of controlling the server system may wish to steer clear of the personally owned data 530 stored on a remote device. This data, therefore, is assigned its own type.

Each category of data may be assigned a synchronized or non-synchronized type. The various categories of data 310, 320, 330, 340, 350, 360, 370, 380, 390, 395, etc. may be assigned the synchronized type 410 or the non-synchronized type 420 by the user in charge of the data. Generally speaking, calendar data 320, some file data 330, bookmark data 340, sales force automation data 360, and customer relations management data 370 are categories of data that need to be accessed and modified by the users carrying the remote device 120 in order to be up to date. These categories of data may be set to the synchronized type 420 by the user in charge of the data. As such, a change in the data 121 in one of these categories on the remote device 120, effected by the roaming user that may be, for example, a field employee, will be reflected at the server system 110 by a corresponding change in the synchronized data 420 on the server system 110. On the other hand, ordinary applications 395 are generally, but not always, non-synchronized 510.

The user in charge of handling the data may move categories of data in and out of the non-synchronized type 410 on the server system 110. In other words, the type of each data category on the server system 110 may be changed depending on the circumstances. As a result, the corresponding categories of data on the remote device 120 may move in and out of the non-synchronized type 510 as well.

An example of moving a category of data in and out of the non-synchronized type 510 is keeping client information data, that are being entered into the remote device 120 by a roaming user in the field, in the non-synchronized type 510 until the user in charge of handling the data at the server location verifies them. In this manner, the client information data, being entered by the roaming user, may not affect the corresponding data at the server location. As long as the data being entered in the field is set as non-synchronized type, the changes in data value will not be transferred to the server location during a synchronization event. After the user in charge of handling the data at the server location decides that the field entries are credible, the corresponding server data 115 may be safely updated by the field entries. Only then, this category of data may be moved from the non-synchronized type 510 to the synchronized type 520. And only then, the server data 420 will be synchronized with the newly modified remote device data 520.

Another example of a category of data that may be moved in and out of the non-synchronized type 510 may include applications such as word processing programs or spreadsheet programs. For example, every time a new version of an application is installed on the server system 110, the user in charge of the data at the server may change the type of the application category to synchronized 420 so that the remote devices 120 may also update their versions of the application through synchronization. After all the remote devices have synchronized their corresponding applications, it is generally more desirable to keep the applications in the non-synchronized type 510 so that a version of the application installed by a user of the remote device is not permitted to corrupt the central copy at the server location.

Another example of a category of data that may need to be changed from synchronized type to non-synchronized type and back again are timesheet entries of employees of an entity. Timesheet entries of each employee may be synchronized throughout a month but at the end of each month an IT administrator may move timesheet entries into the non-synchronized data type and prevent the employee-users to further modify their entries.

Moving the categories of data between the synchronized 420 or the non-synchronized type 410 may be advantageous in many situations. For example, a variety of security risk scenarios can be handled by embodiments of this invention. For example, if erasure happens accidentally at the remote device 120, no permanent loss occurs as long as the deletion is not transferred back to the server system during a synchronization event. To prevent accidental or malicious erasure of data at the server system 110, sensitive categories of data, that are usually not to be modified by users of the remote devices 120, may be set to the non-synchronized type 410. If this data need to be updated on occasion, the user in charge of handling the data may change the data type to synchronized 420 during an active supervision period when he can ensure that the server data 115 are modified according to credible modifications in the remote device data 121. Subsequently, the user in charge of handling the data may change the data type back to non-synchronized 410 and protect it-from modification by the remote device.

Figure 6A:
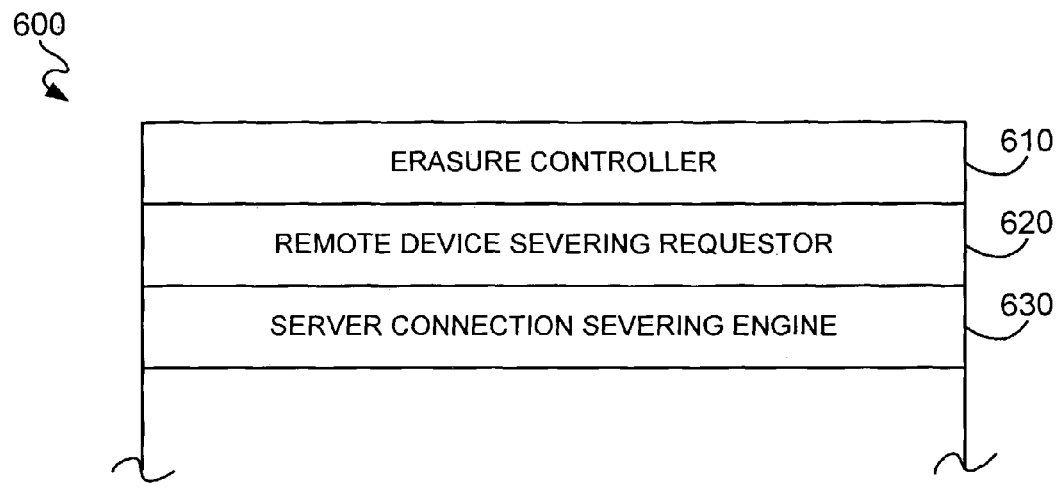
FIG. 6A is a block diagram illustrating an autodestruct server system.

FIG. 6A is a block diagram illustrating an autodestruct server system 600. This block diagram may refer to the autodestruct server 117 included in the remote access server 116 or the autodestruct server 119 included in the synchronization server 118. Both autodestruct server systems 117 and 119 have similar components that perform generally the same operations. Therefore, the components of the two autodestruct server systems 117 and 119 are being discussed together. The differences are being discussed after the common points are set forth.

The autodestruct server system 117, 119 is used to instruct the remote device 120 to destroy the remote device data 121. The autodestruct server system 117, 119 includes an erasure controller 610, a remote device connection severing requestor 620, and a server connection severing engine 630.

The erasure controller 610 transmits a set of erasure instructions to the remote device 120 and controls which data from the remote device data 121 will be deleted according to instructions in the set procedures file 170 or 175. The erasure controller 610 may be an application layer on the remote device 120 using an appropriate operating system depending on the remote device operating system (platform) that may, vary between Windows, Palm, Epoch, and the like. The erasure command may be platform specific and erasure of data may be a complete erasure rather than tagging or pointing to the data that merely marks the data for deletion.

The remote device connection severing requestor 620 requests the remote device 120 to sever its connection with the network 150 that is connected with the server system 110. In response to a request by this requester 620, the remote device 120 severs its connection with the network 150 and thus with other remote devices and the server system 110. Once this connection is severed, the server system 120 and the erasure controller 610.of the autodestruct server 117 or 119 have no access to the remote device 120 and may not control further erasure of data. However, because only those remote device or remote devices that are at issue are severed, the server system 110 still may access other remote devices whose connections to the network 150 remain intact.

The server connection severing engine 630 disconnects the connection between the server system 110 and the network. 150 and thus disconnects the server system 110 from all remote devices in the field. This engine 630 may be used when all remote devices are compromised and the server system 110 needs to sever the connection with all devices 120. Another example 10 scenario of the use of this engine 630 is when an error is detected in the server system 110, such as a virus attack. Preventing the propagation of the error or the virus requires the server system 110 to be isolated from connected devices such as all of the remote devices 120. In short, this engine 630 is usually used when the server system 110 is compromised or when all the remote devices 120 are compromised as opposed to the time when a single remote device 120 or a subset of all of the remote devices 120 are compromised.

In another embodiment of the invention, the server connection severing engine 630 prevents the remote device 120 from accessing the server system 110 by deleting all authorization codes and/or related data (e.g., User ID, MAC ID, password, etc.) for the specific unauthorized remote device 120.

The difference between the two autodestruct servers is that the erasure controller 610 of the autodestruct server 117, residing within the remote access server 116, applies to server non-synchronized data 310 whereas the erasure controller 610 of the autodestruct server 119, residing within the synchronization server 118, applies to server synchronized data 320. However, it will be appreciated by one of ordinary skill in the art that the autodestruct servers 117 and 119 can be combined into a single unit.

Figure 6B:
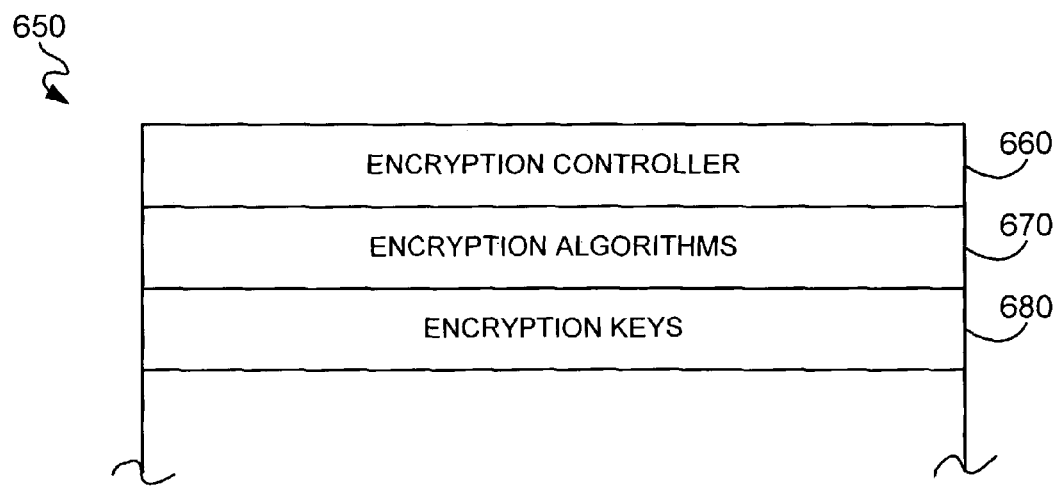
FIG. 6B is a block diagram illustrating an encryption server system.

FIG. 6B is a block diagram illustrating an encryption server system 650. This block diagram may refer to the encryption server 150 in the remote access server 116 or the encryption server 152 in the synchronization server 118. The encryption server 150 is substantially similar to the encryption server 152 by generally having the same components that operate in a similar fashion. The encryption server system 650 includes an encryption controller 660, encryption algorithms 670, and encryption keys 680.

The encryption controller 660 sends instructions to the encryption client 160 and/or 162 in the remote device 120 to encrypt the remote device data 121 or a subset thereof. The encryption controller 660 can be initiated by a system 110 operator and can follow procedures listed in the set procedures file 170 and/or 175. The set procedures for use by the encryption controller 660 can include sending a command to the remote device 120 to encrypt all or a subset of the remote device data 120. The set procedures can also specify what type of encryption algorithm to use as listed in the encryption algorithms 670. The keys used to encrypt and/or decrypt the data are stored in the encryption keys 680.

Figure 7A:
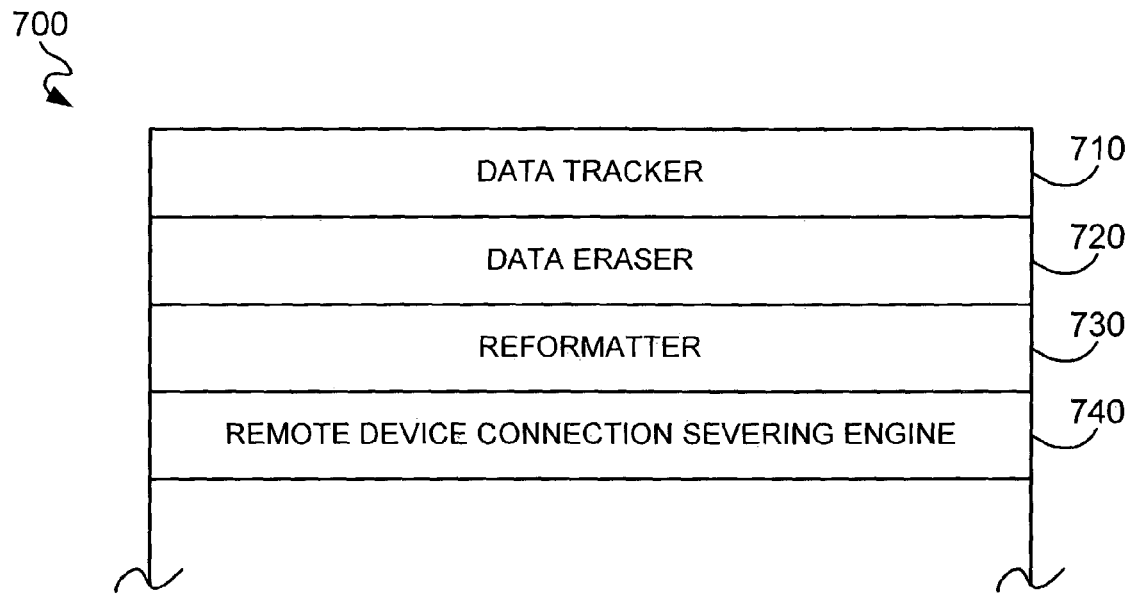
FIG. 7A is a block diagram illustrating an autodestruct client system.

FIG. 7A is a block diagram illustrating an autodestruct client system 700. This block diagram may refer to the autodestruct client 123 included in the remote access client 122 or the autodestruct client 125 included in the synchronization client 124. Both autodestruct client systems 123 and 125 have the same components that perform generally the same operations. Therefore, the components of the two autodestruct client systems 123 and 125 are being discussed together. The differences between the two are being discussed after the common points are set forth.

The autodestruct client system 700 is used to erase the remote device data 121 or a subset thereof. The autodestruct client 700 includes a data tracker 710, a data eraser 720, a reformatter 730, and a remote device connection severing engine 740.

The data tracker 710 system-keeps track of the transfers of data and remembers the final location where the data is stored in the storage 208, the working memory 209, the computer-readable storage medium 206, or elsewhere. Data is communicated between the remote devices 120 and the server system 110, or between the remote devices 120 that are permitted to communicate with one another. The communicated data falls within various types and categories. Every data communicated may be assigned the non-synchronized 410, 510, or synchronized 420, 520 type. Personally owned data 530 is generally not communicated between devices. Data falling within this data type may however be tracked and distinguished from other types as well. Every data from a category such as email data 310, calendar data 320 or the like may further fall within a particular type of non-synchronized 410, 510, synchronized 420, 520 or personally owned 530. Data to be synchronized 410 may first be identified and marked as such by the user in charge of the data. When a synchronized type data 410 is communicated, to a remote device 120, the data tracker 710 keeps track of the location and type of this data. If the user in charge of the data later changes the type assigned to this data, during the next synchronization event the data tracker 710 finds out that the data is no longer of the synchronized type 410 and changes the type assigned to that data. In another option the change in the type of a data may be communicated by the server system to the data tracker 710 as the change takes place. As such, when an erasure command is received for the synchronized data only, the data tracker 710 knows which data are assigned the synchronized type and need to be erased and which are not. The data tracker 710, further has record of the location of the data to be erased within the storage 208, the working memory 209, on a computer-readable storage medium 206, or any other physical location on the computer system 200 that the data may be.

The function of the data tracker 710 may be likened to that of a list. In effect, the data tracker 710 provides the remote device 120 with lists of the various types of data and maintains these lists dynamically as the type of a certain data unit is changed or as the storage location of the data unit is changed. Depending on how often synchronization is set to occur: every time a synchronization order is dispatched by the server system 110, at synchronization intervals preset by a user in charge of the data or the user of the remote device, every time a data unit is updated at the remote device 120 end, and/or according to some other rule, the data tracker 710 identifies the synchronized remote device data 520 that must be synchronized with the synchronized server data 420.

The data eraser 720 system is capable of erasing all or parts of the remote device data 121 on demand from the system 110 or based on a self-initiation following set procedures 180 and/or 185. The data eraser 720 controls which data will be deleted from the remote device data 121 as indicated by the data tracker 710. For example, the data eraser may erase only synchronized data 520 or only personal data 530. The data eraser may use an appropriate operating system depending on the remote device operating system (platform) that may vary between windows, Palm, Epoch, and the like. The erasure command may be platform specific and erasure of data may be complete erasure rather than mere tagging or pointing to the data that is marked for deletion.

The reformatter 730 reformats the remote device 120 storage area 208. By doing so, the reformatter 730 erases all data and severs the connection between the remote device 120 and the network 150. The reformatter 730 does not distinguish between data types or categories. The operation of the reformatter 730 erases the personally owned data 530 of the remote device 120 as well. In an embodiment of the invention, the reformatter 730 does not erase the operating system 291 of the remote device 120 and thus leaves the remote device 120 a thinking and operating machine without its original data or applications 121.

The remote device connection severing engine 740 severs the connection of the synchronization client 124 or the remote access client 122 with the network 150. As a result of operation of this engine 740, the remote device 120 may no longer communicate the particular type of data with the server system 110 or other remote devices 120. The connection severing engine 740 leaves the remote device data 121 intact if initiated before the data eraser 720 or the reformatter 730 is instructed to operate. If the connection severing engine 740 of the autodestruct client 123 of the remote access client 122 operates, the communication of non-synchronized data 510 will be terminated. If the connection severing engine 740 of the autodestruct client 125 of the synchronization client 124 operates, the communication of synchronized data 520 will be terminated. In a possible scenario, the connection severing engine 740 of the autodestruct client 123 of the-remote access client 122 may sever the communication of the non-synchronized data 510. If the data type is subsequently modified by the user in charge of the data from non-synchronized 410 to synchronized 420, that same data will be communicated to the synchronization client 124. As such, the operation of the connection severing engine 740 is selective with respect to the type of data it isolates from communication.

One difference between the autodestruct client 123 included within the remote access client 122 and the autodestruct client 125 included within the synchronization client 124, is that the data eraser 720 of the autodestruct client 123 included in the remote access client 122, applies to client non-synchronized data 510 and personally owned remote device data 530 whereas the data eraser 720 of the autodestruct client 125, included in the synchronization client 124, applies to client synchronized data 520.

Another difference between the autodestruct client 123 of the remote access client 121 and the autodestruct client 125 of the synchronization client 124 is that data tracker 710 of autodestruct client 123, residing within the remote access client 122, tracks the client non-synchronized data 510 and the tracker 710 of the autodestruct client 125, residing within the synchronization client 124, tracks the client synchronized data 520. Each data tracker 710 keeps track of data that is communicated to the remote device 120 or entered into the remote device through its input device 203 by the user. If a data unit (point, file, application, etc.) is moved by the user in charge of the data from the synchronized type 420 to the non-synchronized type 410, the tracker 710 recognizes the change once that data is communicated to the remote device 120. In one scenario, a synchronized data 420 is communicated to the remote device 120 by the synchronization server 118 and is received by the synchronization client 124 at the remote device 120 end. The tracker 710 on the autodestruct client 125 tracks the location and type of this data. The user in charge of the data subsequently changes the type of this data to non-synchronized 410. Upon request from the remote access client 122, the remote access server 116 communicates this data and its associated type to the remote access client 122. The tracker 710 of the autodestruct client 123 records the location and type of this data such that this data can be destroyed upon command. In another option, the synchronization server 118 may communicate the change in the type of data to the tracker 710 of the autodestruct client 125 of the synchronization client 124 during each synchronization event. The tracker 710 of the autodestruct client 125 of the synchronization client 124 may communicate the change in the type of the data to the tracker 710 of the autodestruct client 123 of the remote access client 122. The communication between the two trackers keeps both apprised of the location and type of each data unit.

In general, the remote device 120 is in synchronization with the server system 110 at the organization's head office when the device 120 is first compromised. The device 120 may be compromised if it is lost or stolen or if the employee in control of the device 120 loses authorized status. An example may be when an employee is terminated but retains possession of the remote device 120. For encountering such situations, a mechanism provided by the embodiments of this invention enables the user in charge of the data at the organization to disable the device 120 remotely. For example, in the case of a terminated employee, the user in charge of the data at the organization may indicate to the remote device 120 that the employee's account is no longer valid and the employee should not be able to access the data.

A variety of approaches are taken by the embodiments of the invention depending on what the user in charge of the data suspects. The invention may merely sever the link between the remote device 120 and the server 110. This approach cuts the remote device's 120 access to the data available on the server 110 while leaving the data already on the remote device 120 open to the unauthorized user. The invention may both sever the link and erase all synchronized data available on the remote device 120. This option is used when the data does not lose its value with time and the data on the remote device must not fall in strangers' hands either. The invention may sever the link, delete the data, and delete the applications on the remote device 120. In this scenario, the applications are also sensitive and proprietary and should not be compromised. In addition, as discussed above, the remote device 120 can self-initiate an erasure/encryption procedure.

Figure 7B:
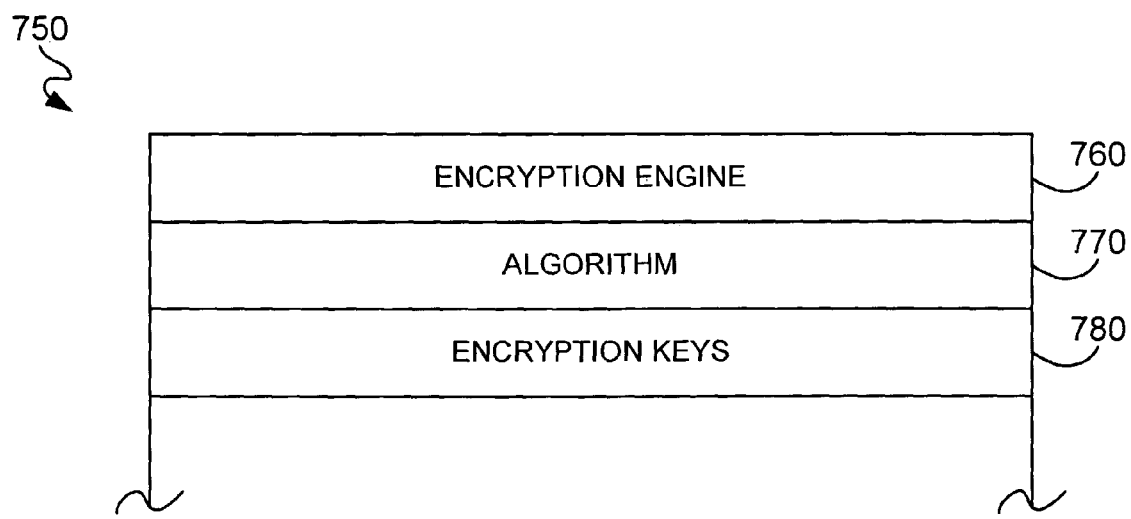
FIG. 7B is a block diagram illustrating an encryption client system.

FIG. 7B is a block diagram illustrating an encryption client system 750. This block diagram may refer to the encryption client 160 included in the remote access client 122 or the encryption client 162 included in the synchronization client 124. Both encryption client systems 160 and 162 have the same components that perform generally the same operations. Therefore, the components of the two encryption client systems 160 and 162 are being discussed together.

The encryption client system 750 includes an encryption engine 760, encryption algorithms 770 and encryption keys 780. The encryption engine 760, in response to commands from the system 110 or when self-initiated, encrypts remote device data 121 or subsets thereof. The data to encrypt is specified in the set procedures file. 170 and/or 175 in the server 110 or the set procedures file 180 and/or 185 in the remote device 120. For example, the set procedures file 180 can specify encryption of all non-synchronized data 510 and all personally owned data 530.

The encryption algorithms 770 are the algorithms used to encrypt the remote device data 121. The algorithms 770 can include public key algorithms, symmetric key algorithms or other encryption algorithms. The keys, used for the encryption algorithms 770 are stored in the encryption keys 780. If the encryptions keys 780 are the same as the decryption keys, then the keys 780 are erased after encryption by the erasure controller 610 and the corresponding keys are stored in the server 110 in encryption keys 680. If the encrypted data cannot be decrypted using the encryption keys 780, the keys 780 do not need to be erased after encryption.

Figure 8A:
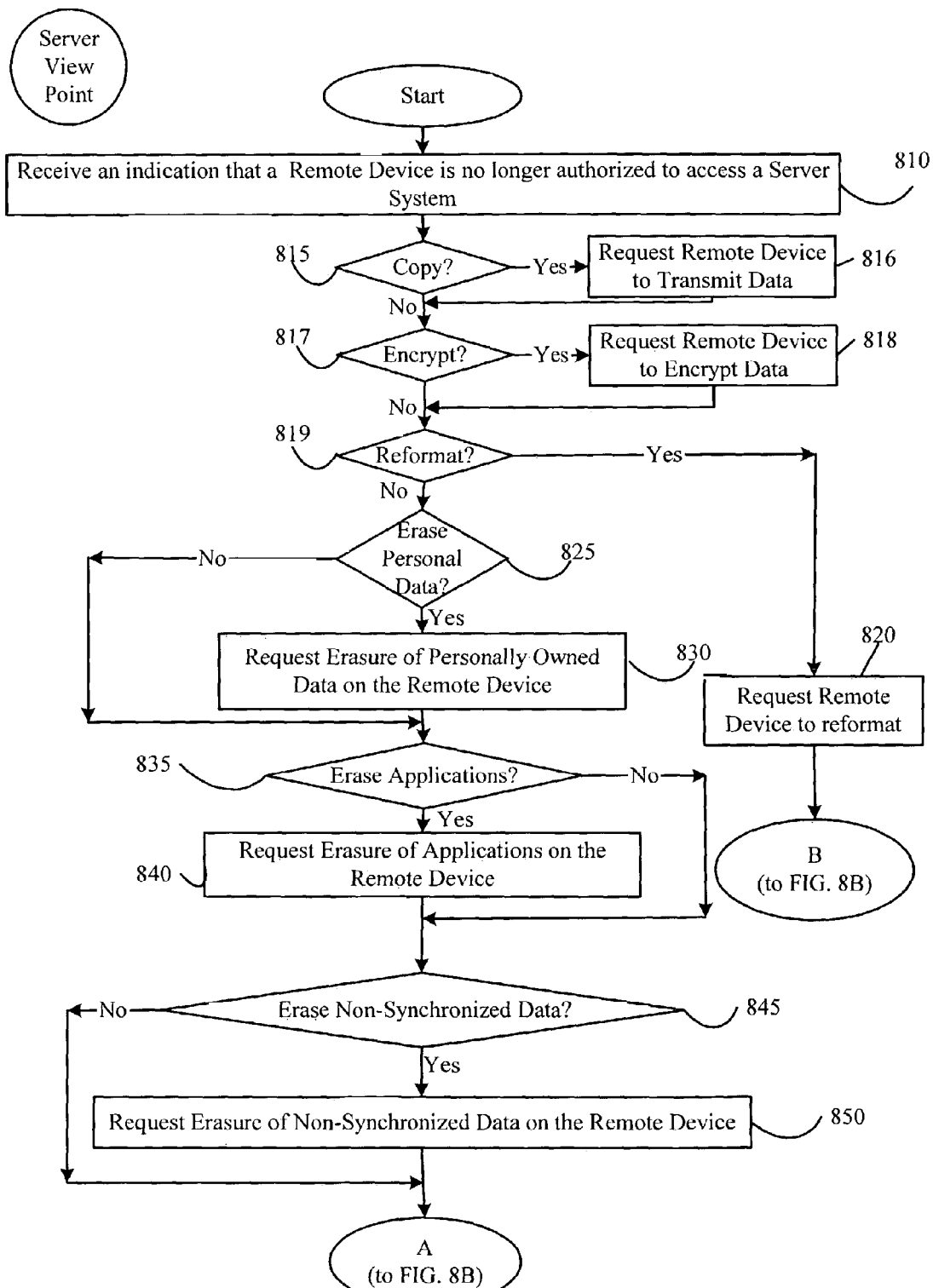
FIG. 8A and FIG. 8B together depict a flowchart illustrating an example process for automatically destroying data and applications on a remote device and severing the connection of the remote device to the server system.
Figure 8B:
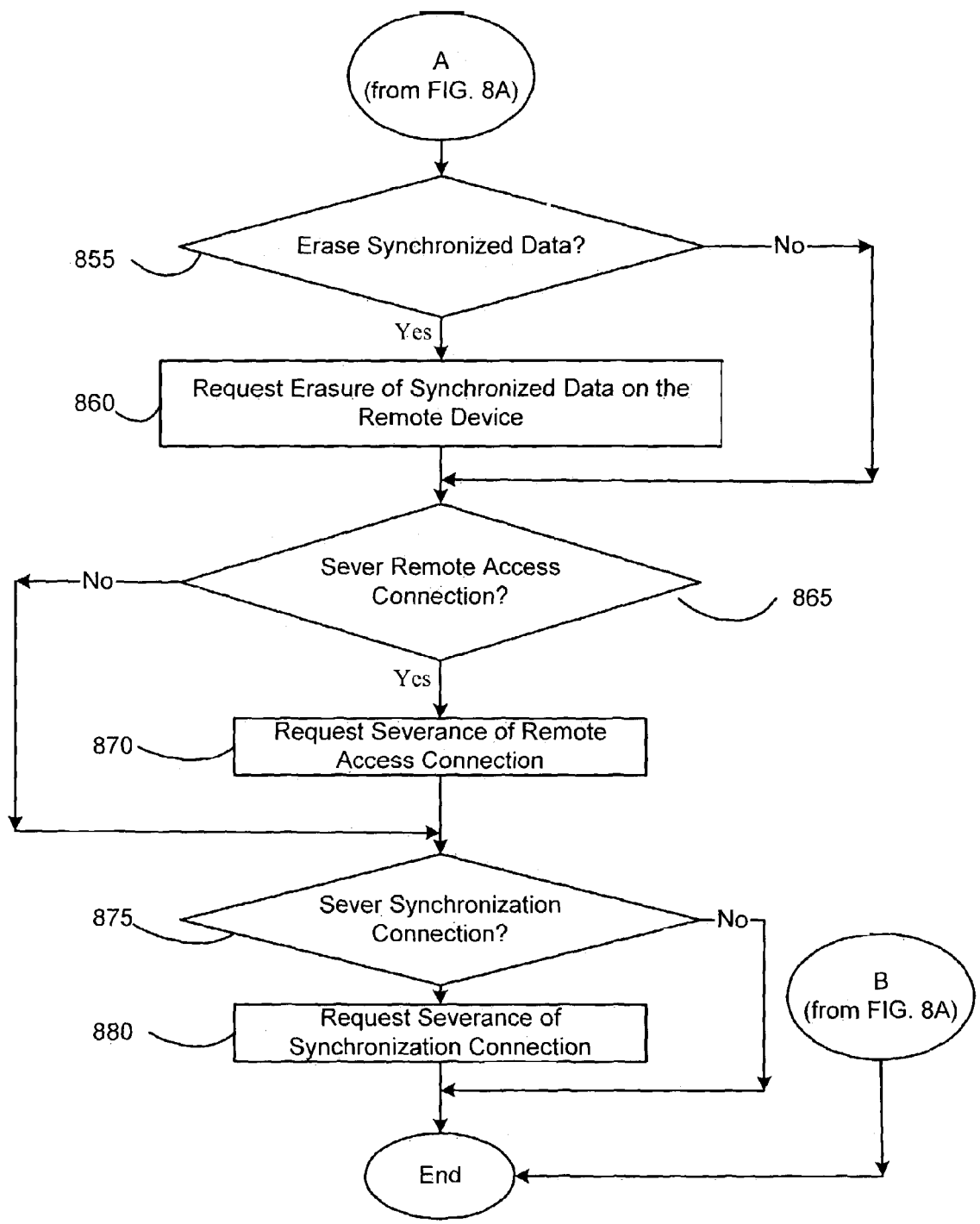

FIG. 8A and FIG. 8B together depict a flowchart illustrating a process for automatically destroying data and applications on a remote device 120 and severing the connection of the remote device 120 to the server system 110. The process illustrated is only an example of various processes that may be implemented using embodiments of the invention. This process is set forth from the viewpoint of the server 110.

In the process of FIGS. 8A and 8B the server system 110 that is in communication with a remote device 120 receives (810) an indication that the remote device 120 is no longer authorized to access the server system. In various scenarios and examples, an authorized field user who has lost its remote device 120 may inform the user in charge of the data at the server 110 location that the remote device 120 has been compromised, the user in charge of the data at the server location may decide that the field user is no longer authorized to use the data or access the server, or some other event may precipitate that results in the remote device 120 losing its authorization to access the server system 110 or even the remote device data 121. The indication that the remote device 120 is compromised may be entered into the server system 110 by the user in charge of the data, or may be communicated to the server system 110 by the remote device 120 itself. In the case that the indication is communicated to they server by the remote device 120 itself, the remote device 120 may be, password protected or may include some type of theft prevention mechanism that-causes-the remote device 120 to communicate a message to the server system 110 in case the wrong password is entered or if the theft prevention mechanism is triggered otherwise. For example, the remote device 120 can communicate a message to the server system 110 if a user does not enter a password into the remote device 120 at a scheduled interval.

The server system 110 requests the remote device 120 to autodestruct in accordance with a set procedure. The set procedure is selected either by the user in charge of the data interactively based on a real time evaluation of the situation or by some preset mechanism that is triggered according to certain preset criteria. The set procedure determines the method and extent of self destruction requested from the remote device 120. For example, the server system 110 may check the sensitivity level of data 121 stored on the remote device 120 and check whether the remote device 120 is lost, stolen, in possession of a terminated employee, or simply loaned by one employee to another. Based on the combination of these preset conditions that are met, the server system may trigger some preset mechanism that deletes all or some of the data, limits access to certain data severs the connection, or leaves the connection intact. The request is communicated from the server-system 110 to the remote device 120 and comprises the following.

The server system 110 first checks (815) if a set procedure is selected that copies the remote data 121 to the server 110 or other location. If so, server 110 requests (816) the remote device 120 to transmit the remote data 121. In an embodiment of the invention, the server system 110 may request (816) that the remote device 121 only transmit a subset of the remote device data 121.

After requesting (816) the transmission or if no transmission of the remote data 121 is requested, the server system 100 checks (817) if the set procedure is selected that encrypts the remote data 121. If the set procedure requires encryption, the encryption controller 660 requests (818) the remote device 120 to encrypt the remote data 121 or a subset thereof by transmitting a message to the encryption engine 760. In an embodiment of the invention, the encryption controller 660 can also specify and/or transmit the encryption algorithms to use as well as the keys to use for encryption.

The server system 110 then checks (819) if a set procedure is selected that reformats the entire-remote device 120. In the embodiment depicted, reformatting the entire remote device 120 is the highest level of autodestruction. If this set procedure is selected (820), the erasure controllers 610 of the autodestruct servers 117, 119 communicate a request to the reformatter 730 to reformat the remote device 120. The reformatter 730 erases all data including all applications but not necessarily the OS 291. Because the reformatter 730 erases applications that maintain the communication between the remote device 120 and the server system 110, erasing all applications automatically severs the connection between the remote device 120 and the server system 110. The remote device 120 will be left with its operating system 291 and thus will remain a thinking and operating machine but will not contain any of the data units (points, files, or applications, etc.) installed on it by the user of the remote device 120 or the user in charge of the data at the server location and will not have any access to the server system 110 to resynchronize the data it lost. This option erases personally owned data 530, as well, and may not be desirable or advisable in certain situations. On the other hand, this option is thorough and rapid.

If the reformatting set procedure is not selected (819), other procedures that erase the remote device data 121 might be used as specified in the set procedure. The server system 110 checks (825) to see if the selected set procedure indicates to erase the personally owned data 530 on the remote device 120. This set procedure may be selected when a user that is not authorized to maintain personally owned data on the remote device nonetheless loads such data unto the device. This set procedure may also be selected when the user of the remote device that has been compromised needs to destroy his personally owned data but the other types of data are not sensitive enough to be destroyed. This set procedure may also be selected when a remote device is transferred from one user to another who may be using all of the data but not the personally owned data of the previous user. If this set procedure is selected, the server system requests (830). erasure of personally owned 530 data on the remote device 120. The erasure controller 610 of the autodestruct server 117 of the remote access server 116 communicates a message to the data eraser 720 of the autodestruct client 123 of the remote access client 122 to erase only the personally owned data 530 of the remote device. The data eraser 720 proceeds to erase the data that the data tracker 710 of the autodestruct client 123 of the remote access client 122 has tracked as personally owned data 530. As mentioned before, the data targeted for erasure is completely erased.

The server system 110 checks (835) if the selected set procedure indicates to erase the applications on the remote device 120. If the set procedure selected indicates erasure of applications, the server system 110 communicates (840) to the remote device 120 to erase the applications. Applications are a category of data and may fall under the synchronized 520 or non-synchronized 510 type. Accordingly, erasure controllers 610 of the autodestruct servers 117, 119 of both the remote access server 116 and the synchronization server 118 may communicate the request for erasure of applications of both types to the data erasers 720 of the autodestruct clients 123, 125 of the remote access client 122 and synchronization clients 124. The data erasers 720 subsequently proceed to completely erase the applications included in the remote device data 121.

The server system 110 then checks (845) if the selected set procedure indicates to erase non-synchronized data 510. If the set procedure selected indicates erasure of non-synchronized data 510, the server system 110 communicates (850) to the remote device 120 to erase the non-synchronized data. The erasure controller 610 of the autodestruct server 117 of the remote access server 116 communicates to the data eraser 720 of the autodestruct client 123 of the remote access client 122 to erase the non-synchronized 510 remote device data. The data eraser 720 identifies the non-synchronized data, 510 based on the information available from the data tracker 710 and proceeds to completely erase that data.

The server system 110 checks (855) if the selected set procedure indicates to erase synchronized data 520. If the set procedure selected indicates erasure of synchronized data 520, the server system 110 communicates (860) to the remote device 120 to erase the synchronized data. The erasure controller 610 of the autodestruct server 119 of the synchronization server 118 communicates to the data eraser 720 of the autodestruct client 125 of the synchronization client 124 to erase the synchronized 520 remote device data. The data eraser 720 identifies the synchronized data 520 based on the information available from the data tracker 710 and proceeds to completely erase that data.

The server system 110 then checks (865) if the selected set procedure indicates to sever the remote access connection with the remote device 120. If the set procedure selected indicates to sever the connection, the server system communicates (870) to the remote device 120 to sever the remote access connection with the server system 110. The remote device connection severing requester 620 of the autodestruct server 117 of the remote access server 116 communicates a request to the remote device connection severing engine 740 of the autodestruct client 123 of the remote access client 122 to sever the remote access connection with the server system 110. In response, the remote device connection severing engine 740 proceeds to sever the remote, access connection between the server system 110 and the remote device 120. In this scenario, the synchronization access has not been severed yet. As a result, only communication of non-synchronized data 510 ceases and synchronized data 520 may still continue to be communicated between the server system 110 and the remote device 120. As mentioned earlier, if a data type is modified from non-synchronized to synchronized by the user in charge of the data it may be communicated via the synchronization server and client as the synchronization connection remains viable.

The, server system 110 then checks (875) if the selected set procedure indicates to sever the synchronization connection with the remote device 120. If the set procedure selected indicates to sever the connection, the server system 110 communicates (880) to the, remote device 120 to sever the synchronization connection with the server system 110. The remote device connection severing requester 620 of the autodestruct server 119 of the synchronization server 118 communicates a request to the remote device connection severing engine 740 of the autodestruct client 125 of the synchronization client 124 to sever the synchronization connection with the server system 110. The remote device connection severing engine 740 proceeds to sever the synchronization connection between the server system 110 and the remote device 120. In this scenario, the non-synchronization access has not been severed (unless severed (870) earlier). As a result, only communication of synchronized data 520 ceases and non-synchronized data 510 may still continue to be communicated between the server system 110 and the remote device 120 if the remote access connection has not been earlier severed (870).

In short, the set procedures set forth in the process of FIGS. 8A and 8B permit total and complete severing of the connection between the server system 110 and the remote device 120, complete encryption of the data 121, a copying of the data 121, a total and complete erasure of data 121 on the remote device or a selective severing of the connection and a selective erasure of data. The process of FIGS. 8A and 8B presents only some of the possible scenarios and scenarios of a different mix and match of connection severing and data erasure may also be accomplished by embodiments of this invention.

In an example security breach scenario, an unauthorized user in custody of the remote device 120 may attempt to turn off the communication capability so as to prevent the server system 110 from requesting destruction of the remote device data 121. However, it would be difficult to do so before the user in charge of the data at the global server requests erasure of the data. In the case of remote devices 120 containing sensitive data, a timed autodestruct feature may be imbedded within the remote device data erasers 720 or reformatter 730 that would automatically erase the sensitive data, identified by type or category, at certain time intervals unless a password is entered into or communicated to the remote device 120.

Figure 9A:
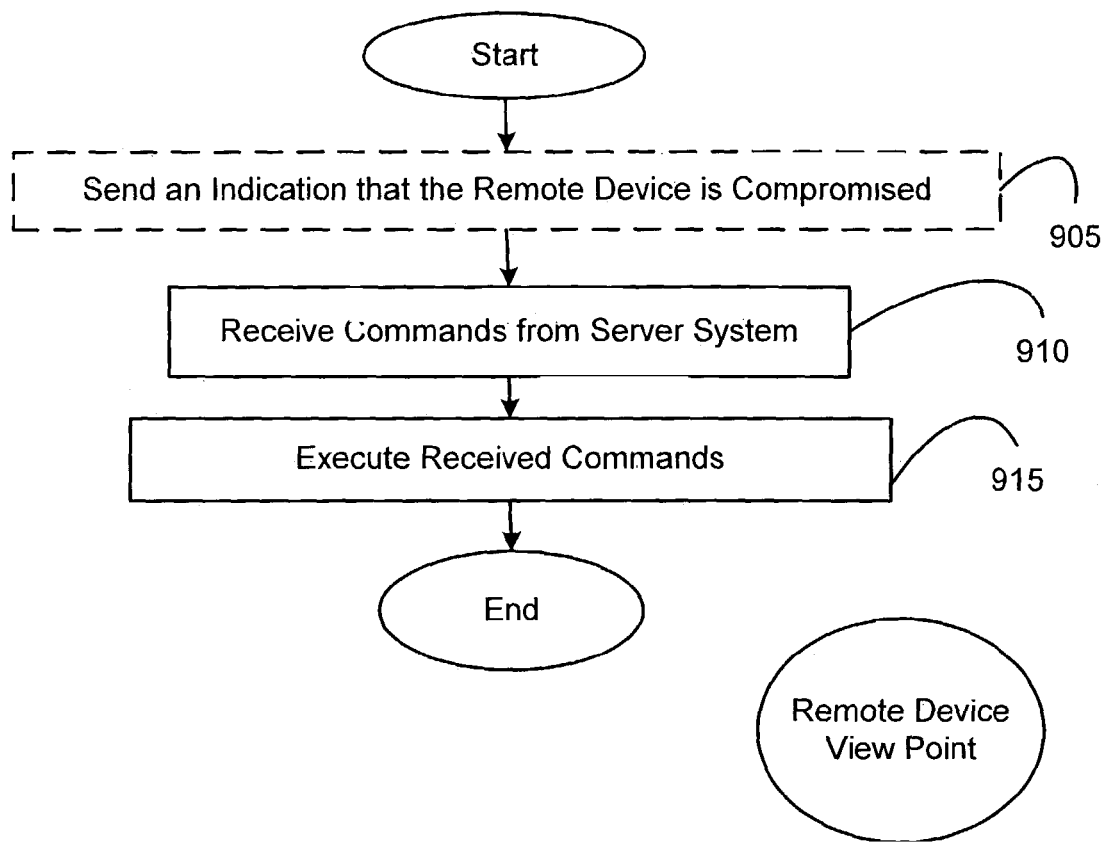
FIG. 9A.
Figure 9B:
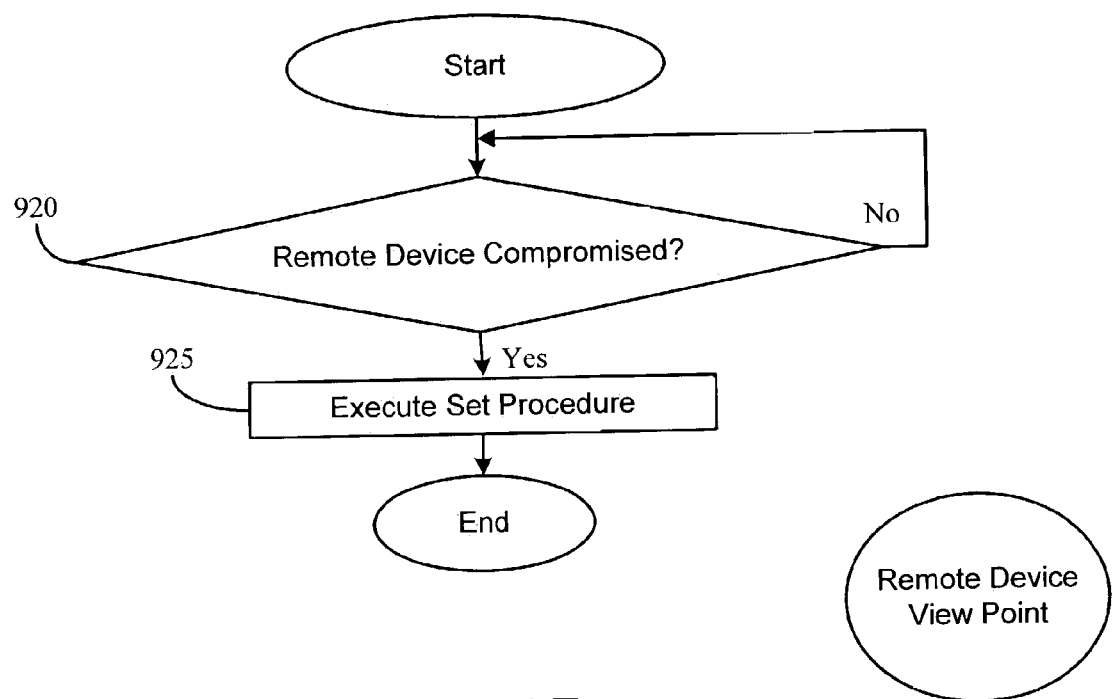
FIG. 9B depict flowcharts illustrating an example process for automatically destroying data and applications on a remote device and severing the connection of the remote device to the server system.

FIGS. 9A and 9B depict a flowcharts illustrating processes for automatically destroying data and applications on a remote device 120 and severing the connection of the remote device 120 to the server system 110. The process illustrated is only an example of various processes that may be implemented using embodiments of the invention. This process is set forth from the viewpoint of the remote device 120.

In the process of FIG. 9A the remote device 120 that is in communication with a server system 110 sends (905), in an embodiment of the invention, an indication that the remote device 120 is compromised. The remote device 120 may be password protected or include some type of theft prevention mechanism that causes the remote device 120 to communicate a message to the server system 110 in case the wrong password is entered or if the theft prevention mechanism is triggered otherwise.

The remote device 120 then receives (910) commands from the server system 10 to copy, erase, and/or encrypt the remote device data 121 in accordance with a set procedure, such as a procedure in the set procedure file 170 or 175, as described in FIGS. 8A and 8B. The set procedure determines the method and extent of self-destruction requested from the remote device 120. The set procedure is selected either by the user in charge of the data interactively based on a real time evaluation of the situation or by some preset mechanism that is triggered according to certain preset criteria. The remote device 120 then executes (915) the received commands and the method depicted in FIG. 9A ends.

In FIG. 9B, the-remote device 120 autonomously self-initiates an autodestruct process. The remote device 120 first determines (920) if it has been compromised. This can be determined (920) if a password has not been entered at a specified interval or if an incorrect password has been entered. In an alternative embodiment, this determination (920) can be made based on not receiving a communication at a specified interval from, the system 110. If the device 120 has not-been compromised, the device 120 can initiate this determination (920) at a later time. Otherwise the remote device 120 executes a set procedure as specified in a set procedures file 180 and/or 185. The set procedure can include encryption, transmission, and/or erasure of all or a subset of the remote data 121 as mentioned above. The set procedure can also include severing connections between the remote device 120 and the network 150.

In short, the set procedures executed in the process of FIGS. 9A and 9B permit total and complete severing of the connection between the server system 110 and the remote device 120, a total and complete erasure of data 121 on the remote device, duplication of the data 121, encryption of the data 121, and/or a selective erasure of data. The process of FIGS. 9A and 9B presents only some of the possible scenarios. Scenarios of a different mix and match of connection severing and data-erasure may also be accomplished by embodiments of this invention.

It will be appreciated by one of ordinary skill in the art that erasure of data 121 under the processes of FIGS. 8A and 8B and FIGS. 9A and 9B may occur in different mixes and matches of data types and categories. Only certain categories of data 121 may be targeted for erasure. For example, only organizational directory data may be selected for erasure. Depending on whether this data category is assigned synchronized or non-synchronized type, the autodestruct servers of the remote access server 117 or the synchronization server 119 may request erasure, from the remote device 120. The data tracker 710 would have the location of storage, the type, and the category of each data and makes it available to the data eraser 720 for selective-erasing.

The foregoing description of the embodiments of the invention is by way of example only, and other variations of the above-described embodiments and processes are provided by the present invention. For example, although the server system is illustrated as a single device, the server system may include several computers networked together. Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. Many variations are possible in light of the foregoing teachings. For example, the embodiments described above may use instructions to effect data erasure or severance of the connections. In other embodiments, data erasure may also be accomplished by a synchronization event by deleting the data on the server system and instructing synchronization to delete the corresponding data on the remote device as well. On the other hand, mechanisms in the server system or the remote device may prevent or delay synchronization if the data on the remote device is deleted until it is confirmed that such deletion has not been accidental. As another example, in the above embodiments, deletion of data is accomplished by complete deletion and writing over the storage area-not just tagging or pointing at it. In other embodiments, deletion may be accomplished by tagging or pointing at the deleted data. The method, system, and computer program product described are limited only by the claims that follow.

What is claimed is:

1. A method of controlling access to data including a plurality of sets of data, the plurality of sets of data comprising a first set of data items to be synchronized between a server system and a remote device, the remote device being remote from the server system, and a second, different, set of data items held on the remote device, the first set of data items including data items whose values are updated at the server system in response to changes thereto on the remote device, the second set of data items including data items whose values are not updated at the server system in response to changes thereto on the remote device, the remote device providing access to at least some of the data held thereon, the method comprising:

maintaining, on the remote device, a list identifying each data item as belonging to one of the first set and the second set;

receiving, at the server system, an indication that the remote device is compromised, the indication originating from a source other than the remote device;

selecting, at the server system, a subset of data stored on the remote device, the selected subset of data being specified as having data items either from the first set or data items from the second set;

transmitting, to the remote device in response to the indication, a command to prevent access to the selected subset of data;

using, at the remote device, the list and specification of data items from the first or second set to identify the selected subset of data on the remote device;

preventing access to the identified subset of data based on the transmitted command; and maintaining access to a further subset of data on the remote device, the further subset of data having data items from the first set or data items from the second set, the set of data of the plurality of sets to which the data items of the further subset of data belong being different to the set of data of the plurality of sets to which the data items of the selected subset of data belong.

2. The method of claim 1, wherein the step of preventing access to the selected subset of data includes erasing the selected subset of data.

3. The method of claim 1, wherein the step of preventing access to the selected subset of data includes encrypting the selected subset of data.

4. The method of claim 1, comprising:
transmitting, to the remote device, a further command to transmit the selected subset of data to another device.

5. The method of claim 1, wherein the selected subset of data includes personal data.

6. The method of claim 1, wherein the selected subset of data includes applications.

7. The method of claim 1, further comprising:
transmitting a disconnect command, to the remote device from the server, responsive to the indication, to prevent a connection between the remote device and the server to disable further communication with respect to the selected subset of data.

8. The method of claim 1, wherein the indication is transmitted by the remote device.

9. A non-transitory computer-readable storage medium having computer-readable instructions stored thereon, the computer-readable instructions when executed by a computing device cause the computing device to perform a method of controlling access to data including a plurality of sets of data, the plurality of sets of data including a first set of data to be synchronized between a server system and a device remote therefrom and a second, different, set of data held on the remote device, the first set of data items including data items whose values are updated at the server system in response to changes thereto on the remote device, the second set of data items including data items whose values are not updated at the server system in response to changes thereto on the remote device, the remote device providing access to at least some of the data held thereon, the method comprising:
maintaining, at the remote device, a list of data items identifying each data item as belonging to the first set or the second set;
receiving, at the remote device, a command specifying at least one technique employed by the remote device to prevent access to a first subset of data stored thereon, the first subset of data being specified as belonging to the first set or the second set;
using, at the remote device, the list and specification of data items from the first or second sets to identify the first subset of data on the remote device;
preventing access to the identified first subset of data based on the transmitted command; and
maintaining access to a second subset of data on the remove device, the second subset of data having data items from the first set or data items from the second set, the set of data of the plurality of sets of data to which the data items of the second subset of data belong being different to the set of data of the plurality of sets to which the data items of the first subset of data belong,
wherein the command is received in response to an indication that the remote device is compromised originating from a source other than the remote device.

10. A server system for use in controlling access to data held on a remote device, the remote device being remote from the server system and holding a plurality of sets of data, the plurality of sets of data including a first set of data to be synchronized between the remote device and the server system and a second, different, set of data, the first set of data items including data items whose values are updated at the server system in response to changes thereto on the remote device, and the second set of data items includes data items whose values are not updated at the server system in response to changes thereto, the remote device providing access to at least some of the data held thereon, the remote device including a list identifying each data item as belonging to the first set or the second set, and the server system comprising:
a procedures file to indicate techniques to prevent data from the first set and data from the second set held on the remote device from being accessed; and
a server configured to
receive an indication that the remote device is compromised, the indication originating from a source other than the remote device,
select a subset of data stored on the remote device in response to the indication, the selected subset being specified as having data items from the first set or data items from the second set, and
transmit, to the remote device, a command specifying at least one technique included in the procedures file to prevent access to the selected subset of data stored thereon,
wherein the transmitted command results in the remote device preventing access to the selected subset of data, the selected subset of data being identified using the list and the specification of data items from the first set or second set,
the remote device maintaining access to a further subset of data held thereon, the further subset of data having data items from the first set or data items from the second set, the set of data of the plurality of sets to which the data items of the further subset of data belong being different to the set of data of the plurality of sets to which the data item of the selected subset of data belong.

11. The system of claim 10, wherein the at least one technique includes erasing the selected subset of data.

12. The system of claim 10, wherein the at least one technique includes encrypting the selected subset of data.

13. The system of claim 10, wherein the server is further configured to transmit, to the remote device and responsive to receipt of the indication, a further command to transfer the selected subset of data to another device.

14. The system of claim 10, wherein the second set of data includes personal data.

15. The system of claim 10, wherein the second set of data includes applications.

16. The system of claim 10, wherein the server is further capable of transmitting a disconnect command, to the remote device, responsive to the indication, to prevent a connection between the remote device and the server to disable further communication with respect to the subset of data.

17. The system of claim 10, wherein the indication is transmitted to the server by the remote device.

18. A client device for use in controlling data held thereon, the client device holding a plurality of sets of data, the plurality of sets of data including a first set of data items to be synchronized between the client device and a server system and a second, different set of data items held on the client device, the first set of data items including data items whose values are updated at the server system in response to changes thereto on the remote device, the second set of data items including data items whose values are not updated at the server system in response to changes thereto at the client device, the client device comprising:

a data tracker configured to track a location of data items held in the client device, the data tracker tracking a correspondence of the data items to the first set or the second set device, wherein the client device is configured to receive a command from the server system to prevent access to a first subset of data identified as belonging to the first set or the second set, and is configured to execute, in accordance with information generated by the data tracker and the set to which the first subset of data belongs, at least one technique to prevent access to the first subset of data stored on the client device in response to receipt of the command, the command being received in response to an indication that the client device is compromised, the indication originating from a source other than the client device, the client device being configured to maintain access to a second subset of data, the second subset of data having data items from the first set or data items from the second set, the set of data of the plurality of sets to which the data items of the second subset of data belong being different to the set of data of the plurality of sets to which the data items of the first subset of data belong.

19. The client device of claim 18, wherein the command specifies erasing the first subset of data.

20. The client device of claim 18, wherein command specifies encrypting the first subset of data.

21. The client device of claim 18, wherein the client device is configured to receive, at the client device, a further command operative to transmit the first subset of data to another device, and to transmit the first subset of data to another location.

22. The client device of claim 18, wherein the first subset of data includes personal data.

23. The client device of claim 18, wherein the first subset of data includes applications.

24. The client device of claim 18, comprising:

a client device severing engine configured to receive a further command, at the client device, to sever a connection between the client device and a network, and to sever the connection between the client device and the network.

25. The method of claim 1, wherein the list identifies a location of each of the data items.

26. The method of claim 1, further comprising:

identifying a location of the selected subset of data on the remote device.

27. The server system of claim 10, wherein the server system identifies sets of data items, and communicates a change of set of a data item to the remote device, the remote device updating the list in accordance with the change of set.

28. The client device of claim 18, wherein the information generated by the data tracker includes an indication of whether a data item belongs to the first set or the second set.

29. The client device of claim 18, wherein the data tracker includes a list identifying each data item as belonging to the first set or the second set, and the client device is configured to modify the list in accordance with receipt of an indication of change of set with respect to a data item.

30. The method of claim 1, wherein the indication that the remote device is compromised is received from a user.

31. The server system of claim 10, further comprising input means for receiving the indication that the remote device is compromised from a user.

* * * * *

UNITED STATES PATENT AND TRADEMARK OFFICE
CERTIFICATE OF CORRECTION

| | |
|---|---|
| PATENT NO. | : 8,012,219 B2 |
| APPLICATION NO. | : 10/637267 |
| DATED | : September 6, 2011 |
| INVENTOR(S) | : Daniel J. Mendez et al. |

It is certified that error appears in the above-identified patent and that said Letters Patent is hereby corrected as shown below:

In the Claims:

Claim 9, Column 23, Line 56, change "remove device," to read --remote device,--.

Claim 18, Column 24, Line 66, change "thereto on the remote device," to read --thereto on the client device,--.

Claim 18, Column 25, Line 6, change "second set device," to read --second set,--.

Signed and Sealed this
Eighteenth Day of June, 2013

Teresa Stanek Rea
*Acting Director of the United States Patent and Trademark Office*